(12) United States Patent
Ma et al.

(10) Patent No.: US 11,631,992 B2
(45) Date of Patent: Apr. 18, 2023

(54) ELECTRIC CHARGING PARTICLE HEATER FOR THERMAL ENERGY STORAGE

(71) Applicants: Alliance for Sustainable Energy, LLC, Golden, CO (US); Purdue Research Foundation—Office of Technology Commercialization, West Lafayette, IN (US)

(72) Inventors: Zhiwen Ma, Golden, CO (US); Jeffrey Clayton Gifford, Denver, CO (US); Patrick Gordon Davenport, Boulder, CO (US); Dening Jia, Lakewood, CO (US); Jason Schirck, West Lafayette, IN (US); Aaron Morris, West Lafayette, IN (US)

(73) Assignees: Alliance for Sustainable Energy, LLC, Golden, CO (US); Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 17/375,105

(22) Filed: Jul. 14, 2021

(65) Prior Publication Data
US 2022/0021239 A1 Jan. 20, 2022

Related U.S. Application Data

(60) Provisional application No. 63/051,534, filed on Jul. 14, 2020.

(51) Int. Cl.
*H02J 15/00* (2006.01)
*F28D 20/00* (2006.01)

(52) U.S. Cl.
CPC .......... *H02J 15/00* (2013.01); *F28D 20/0056* (2013.01); *F28D 2020/0004* (2013.01);
(Continued)

(58) Field of Classification Search
CPC .......... H02J 15/00; F28D 20/0056; F28D 2020/0004; F28D 2020/0069; F28D 2020/0078; F28D 2020/0082
See application file for complete search history.

(56) References Cited

U.S. PATENT DOCUMENTS

| 4,338,919 A | 7/1982 | Hwang |
| 6,983,105 B1 | 1/2006 | Greene |

(Continued)

FOREIGN PATENT DOCUMENTS

WO 2019204337 A1 10/2019

OTHER PUBLICATIONS

Gulen et al., "Second Law Efficiency of the Rankine Bottoming Cycle of a Combined Cycle Power Plant", ASME Turbo Expo 2008: Power for Land, Sea, and Air, GT2008-51381, Jun. 2008, Berlin, Germany, pp. 1017-1027.

(Continued)

*Primary Examiner* — Shafiq Mian
(74) *Attorney, Agent, or Firm* — Alexandra M. Hall

(57) ABSTRACT

The disclosure relates to particle heaters for heating solid particles to store electrical energy as thermal energy. Thermal energy storage directly converts off-peak electricity into heat for thermal energy storage, which may be converted back to electricity, for example during peak-hour power generation. The particle heater is an integral part of an electro-thermal energy storage system, as it enables the conversion of electrical energy into thermal energy. As described herein, particle heater designs are described that provide efficient heating of solid particles in an efficient and compact configuration to achieve high energy density and low cost.

16 Claims, 19 Drawing Sheets

(52) U.S. Cl.
CPC ............... *F28D 2020/0069* (2013.01); *F28D 2020/0078* (2013.01); *F28D 2020/0082* (2013.01)

(56) References Cited

U.S. PATENT DOCUMENTS

| | | | |
|---|---|---|---|
| 7,273,981 B2 | 9/2007 | Bell | |
| 8,821,827 B2 | 9/2014 | Kim et al. | |
| 9,347,690 B2* | 5/2016 | Ma | F28D 13/00 |
| 9,651,313 B2 | 5/2017 | Trainham et al. | |
| 9,702,348 B2 | 7/2017 | Ma | |
| 2003/0121908 A1* | 7/2003 | Pilavdzic | B29C 48/865 |
| | | | 219/630 |
| 2014/0299120 A1* | 10/2014 | Klinkman | F24S 20/67 |
| | | | 126/620 |
| 2014/0366536 A1* | 12/2014 | Muren | F03G 6/00 |
| | | | 126/618 |
| 2016/0097564 A1* | 4/2016 | Maryamchik | F24S 70/60 |
| | | | 126/643 |
| 2017/0362484 A1* | 12/2017 | Abbasi | C09K 5/14 |
| 2019/0316812 A1* | 10/2019 | Ho | F24S 25/40 |
| 2020/0124356 A1 | 4/2020 | Ma et al. | |
| 2022/0146205 A1 | 5/2022 | Eronen et al. | |

OTHER PUBLICATIONS

Ma et al., "Thermal energy storage using solid particles for long-duration energy storage", ASME 2020 14th International Conference on Energy Sustainability, ES2020, Jun. 2020, pp. 1-9.

Ma et al., "Design analysis of a particle-based thermal energy storage system for concentrating solar power or grid energy storage", Journal of Energy Storage, Jun. 2020, vol. 29, pp. 1-15.

Gifford et al., "Thermal analysis of insulation design for a thermal energy storage silo long-duration electricity storage", Frontiers in Energy Research, Jun. 2020, vol. 8, No. 99, pp. 1-12.

Morris et al., "A Conductive Heat Transfer Model for Particle Flows over Immersed Surfaces", International Journal of Heat and Mass Transfer, Oct. 2015, vol. 89, pp. 1277-1289.

International Search Report and Written Opinion for International (PCT) Application No. PCT/US2021/041533, dated Oct. 21, 2021, pp. 1-8.

"Energy Storages are Essential in the Energy Systems of the Future", available at https://polarnightenergy.fi/solutions, accessed on Jul. 13, 2022, pp. 1-5.

"Store Wind and Solar Power as Heat in Sand", available at https://polarnightenergy.fi/technology, accessed on Jul. 13, 2022, pp. 1-6.

* cited by examiner

165

170

ELECTRIC CHARGING PARTICLE HEATER FOR THERMAL ENERGY STORAGE

CROSS-REFERENCE TO RELATED APPLICATIONS

This application claims priority from U.S. Provisional Patent Application No. 63/051,534 filed on Jul. 14, 2020, the contents of which are incorporated herein by reference in their entirety.

CONTRACTUAL ORIGIN

This invention was made with government support under Contract No. DE-AC36-08GO28308 awarded by the Department of Energy. The government has certain rights in the invention.

BACKGROUND

Renewable energy resources have been limited by the ability to store energy produced during off-peak times for use during peak times. Energy storage is important for variable-regeneration renewable energy sources, such as wind and solar. However, current battery technologies are too expensive for grid-scale, long duration energy storage. Molten salt storage is expensive and limited by salt stability and corrosion issues. Pumped energy storage in the form of hydroelectricity is limited by the geological conditions of the system as it requires two reservoirs at different vertical levels. Thus, there remains a need for improved energy storage systems capable of storing excess electricity produced by alternative energy sources such as wind and solar, to be recovered later during peak electricity demand.

SUMMARY

An aspect of the present disclosure is a heater for heating a plurality of solid particles, the heater including at least two three-dimensional (3D) shapes, each 3D shape including at least two surfaces, in which each surface of each 3D shape includes at least two lateral edges positioned substantially parallel to a first axis (z), each lateral edge has a length between a proximal end and a distal end, each surface includes a proximal edge positioned at the proximal end of the length and within a first plane defined by a second axis (x) and a third axis (y), the proximal edges of each surface of each 3D shape form a cross-sectional shape in the plane, at least one surface of each 3D shape is positioned to face at least one surface of another 3D shape defining a channel, the channel is oriented to enable the gravitational flow of the plurality of solid particles through the channel, at least one surface defining the channel is configured to transfer heat to at least a portion of the plurality of solid particles, x and y are each perpendicular to z, and x and y are perpendicular to each other.

In some embodiments, the at least one surface defining the channel is configured to operate at a temperature between about 500° C. to about 1500° C. In some embodiments, the cross-sectional shape is a polygon. In some embodiments, the polygon has an interior angle defined as the angle between x and a proximal edge, and the interior angle is in the range of about 5° to about 60°. In some embodiments, the interior angle is approximately 10°. In some embodiments, the polygon is a triangle, a quadrilateral, a pentagon, a hexagon, a heptagon, an octagon, a nonagon, or a decagon. In some embodiments, the at least one surface defining the channel configured to transfer heat comprises a resistive heating element. In some embodiments, the resistive heating element is positioned within an indentation in the at least one surface defining the channel. In some embodiments, the resistive heating element comprises an electric-resisting wire or bar. In some embodiments, the channel has a height substantially parallel with y. In some embodiments, the height is in the range of about 0.05 m to about 1.5 m. In some embodiments, the height is approximately 0.15 m. In some embodiments, the channel has a width substantially parallel with x. In some embodiments, the width is in the range of about 0.05 m to about 1.5 m. In some embodiments, the width is approximately 0.15 m. In some embodiments, a block positioned between the at least two 3D shapes and filling at least a portion of the channel and the block is configured to maintain the width of the channel. In some embodiments, the block comprises a substantially insulative material. In some embodiments, the block is further configured to direct the plurality of solid particles towards the at least one surface defining the channel configured to transfer heat An aspect of the present disclosure is a particle heater configured to heat a plurality of solid particles, the particle heater including a heater module having an inlet and an outlet and substantially filled with a plurality of heating elements which define a plurality of channels, in which the plurality of heating elements are configured to direct the plurality of solid particles through the plurality of channels, the plurality of heating elements are configured to receive electrical energy to generate heat resulting in heating of the plurality of solid particles from a temperature at the inlet between about 250° C. and about 500° C. to a temperature at the outlet between about 850° C. and about 1,200° C.

An aspect of the present disclosure is a method of heating a plurality of solid particles, the method including receiving the plurality of solid particles to an inlet of a heater module substantially filled with a plurality of heating elements which define a plurality of channels, directing the plurality of solid particles through the plurality of channels, heating the plurality of solid particles from a temperature at the inlet between about 250° C. and about 500° C. to a temperature at an outlet of the heater module between about 850° C. and about 1,200° C. using the plurality of heating elements, and removing the plurality of solid particles from the heater module via the outlet, in which the plurality of heating elements are configured to receive an electrical energy and convert the electrical energy to a thermal energy for the heating.

BRIEF DESCRIPTION OF THE DRAWINGS

Some embodiments of the present disclosure are illustrated in the referenced figures of the drawings. It is intended that the embodiments and figures disclosed herein are to be considered illustrative rather than limiting.

Figure 1A:
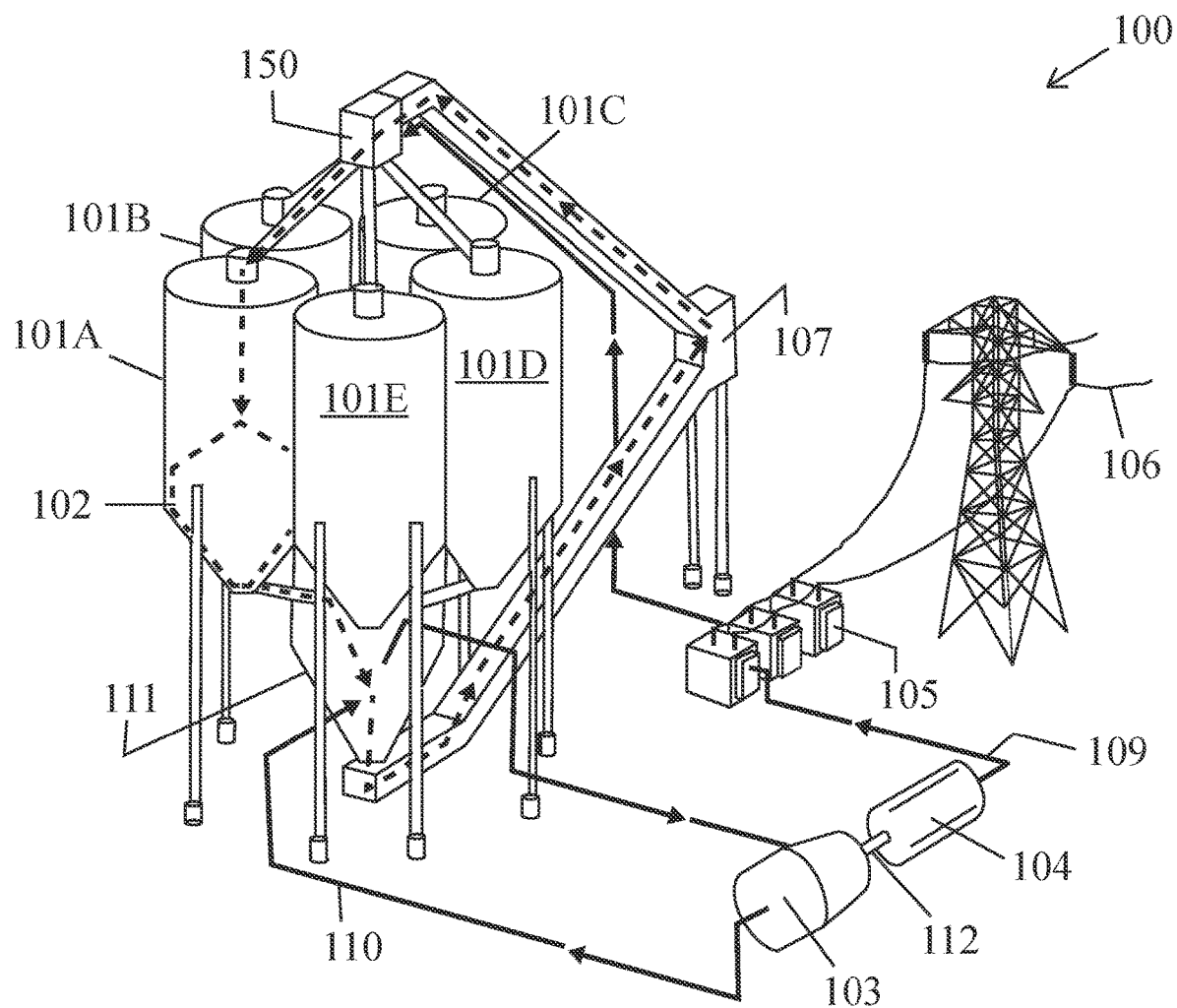
FIG. 1A illustrates a thermal energy storage system, including particle heater, according to some embodiments of the present disclosure.

| REFERENCE NUMERALS | |
|---|---|
| 100 | energy storage system |
| 101 | silo |
| 102 | solid particles and/or solid particle stream |
| 103 | turbine |
| 104 | generator or motor |
| 105 | substation |
| 106 | grid line |
| 107 | particle conveyor |
| 109 | electrical supply line |
| 110 | working fluid and/or working fluid stream |
| 111 | fluidized bed heat exchanger |
| 112 | shaft |
| 150 | particle heater |
| 155 | heater module |
| 160 | housing |
| 165 | first vessel (particle distributor) |
| 170 | second vessel (particle collector) |
| 175 | valve |
| 177 | I-beam |
| 180 | heating element |
| 181 | surface |
| 183 | cross-sectional shape |
| 184 | length (L) |
| 185 | insulation |
| 186 | lateral edge |
| 187 | duct |
| 188 | indentation |
| 189 | support |
| 190 | channel |
| 191 | proximal edge |
| 193 | distal edge |
| 194 | wire |
| 195 | inlet |
| 197 | outlet |

DETAILED DESCRIPTION

The present disclosure may address one or more of the problems and deficiencies of the prior art discussed above. However, it is contemplated that some embodiments as disclosed herein may prove useful in addressing other problems and deficiencies in a number of technical areas. Therefore, the embodiments described herein should not necessarily be construed as limited to addressing any of the particular problems or deficiencies discussed herein.

References in the specification to "one embodiment", "an embodiment", "an example embodiment", "some embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

As used herein the term "substantially" is used to indicate that exact values are not necessarily attainable. By way of example, one of ordinary skill in the art will understand that in some chemical reactions 100% conversion of a reactant is possible, yet unlikely. Most of a reactant may be converted to a product and conversion of the reactant may asymptotically approach 100% conversion. So, although from a practical perspective 100% of the reactant is converted, from a technical perspective, a small and sometimes difficult to define amount remains. For this example of a chemical reactant, that amount may be relatively easily defined by the detection limits of the instrument used to test for it. However, in many cases, this amount may not be easily defined, hence the use of the term "substantially". In some embodiments of the present invention, the term "substantially" is defined as approaching a specific numeric value or target to within 20%, 15%, 10%, 5%, or within 1% of the value or target. In further embodiments of the present invention, the term "substantially" is defined as approaching a specific numeric value or target to within 1%, 0.9%, 0.8%, 0.7%, 0.6%, 0.5%, 0.4%, 0.3%, 0.2%, or 0.1% of the value or target.

As used herein, the term "about" is used to indicate that exact values are not necessarily attainable. Therefore, the term "about" is used to indicate this uncertainty limit. In some embodiments of the present invention, the term "about" is used to indicate an uncertainty limit of less than or equal to ±20%, ±15%, ±10%, ±5%, or ±1% of a specific numeric value or target. In some embodiments of the present invention, the term "about" is used to indicate an uncertainty limit of less than or equal to ±1%, ±0.9%, ±0.8%, ±0.7%, ±0.6%, ±0.5%, ±0.4%, ±0.3%, ±0.2%, or ±0.1% of a specific numeric value or target.

Among other things, the present disclosure relates to heaters for heating solid particles to store electrical energy as thermal energy. Electro-thermal energy storage directly converts off-peak electricity into heat for thermal energy storage, which may be converted back to electricity, for example during peak-hour power generation. Thus, electro-thermal energy storage will, among other things, enable better incorporation of intermittent renewable energy sources such as solar and wind into existing electrical grids, which will in turn result in improved grid resilience. The particle heater is important part of an electro-thermal energy storage system, as it enables the conversion of electrical energy into thermal energy. Thus, among other things, the present disclosure describes electric particle heaters for this important energy conversion step. As described herein, particle heater designs are described that provide efficient heating of solid particles in an efficient and compact configuration to achieve high energy density and low cost.

FIG. 1A illustrates an energy storage system 100, including a particle heater 150, according to some embodiments of the present disclosure. In this exemplary energy storage system 100, a silo 101 (i.e., a storage vessel; four shown 101A-D) is provided, which may be utilized for the storage of solid particles 102. A particle heater 150, as described in detail herein, may be positioned near and/or inside the silo 101, such that the particle heater 150 is configured to heat the solid particles 102 from a first relatively low temperature of between about 250° C. and about 500° C. to a second relatively high temperature between about 850° C. and about 1,200° C. prior to the solid particles 102 entering a silo 101 during a "charging mode", where the solid particles 102 are heated using electricity. Thus, a particle heater 150 may be an electric heater (e.g., using resistive heating elements), with the electric power needed to drive the electric heater provided from the grid as shown by electrical supply line 109 shown in FIG. 1A. The heated solid particles 102, and the thermal energy stored within the solid particles 102, may then be stored within a silo 101 until such a time when the local or regional electrical needs (e.g., time periods of peak electrical energy usage) require that the thermal energy stored in the heated solid particles 102 be converted back to electricity.

In some embodiments of the present disclosure, the thermal energy stored in the solid particles 102 may be converted to electricity by passing the heated solid particles 102 through a fluidized bed heat exchanger 111 that transfers heat from the particles 102 to a heat transfer fluid (i.e., a working fluid and/or working fluid stream 110). For example, the hot solid particles 102 may be transported from the silo 102 to a fluidized bed heat exchanger 111 in which the hot solid particles 102 come into direct contact with the working fluid 110. As shown in FIG. 1A, in some embodiments of the present disclosure, a fluidized bed heat exchanger 111 may be an integral component of a silo 102, such that the hot solid particles 102 may be transported by gravity from within the silo 102 to the fluidized bed heat exchanger 111. In some embodiments of the present disclosure, for example when the fluidized bed heat exchanger 111 is not an integral part of the silo 102, the hot solid particles 102 may be transported to a fluidized bed heat exchanger 111 gravitationally, pneumatically, and/or mechanically (e.g., by the use of a conveyer similar to particle conveyor 107). As shown in FIG. 1A, a fluidized bed heat exchanger 111 may be configured to transfer thermal energy (i.e., heat) from the solid particles 101 to a working fluid 110 (i.e., an inert gas or heat transfer fluid), thereby heating the working fluid 110 to a temperature between about 700° C. and about 1,200° C. and cooling the solid particles 102 to a temperature between about 250° C. and about 500° C. The heated working fluid 110 may be subsequently directed to a turbine 103, which in turn may drive a shaft 112 connected to a generator or motor 104, such that at least a portion of the thermal energy recovered from the solid particles is converted to electrical energy 109, which may then be transferred to a substation 105 and finally to a grid line 106 for transport to the power grid. The now expanded and cooled working fluid 110 may then be directed to a compressor (not shown) to provide the driving force needed to circulate the working fluid 110 back through the fluidized bed heat exchanger 111.

Figure 2:
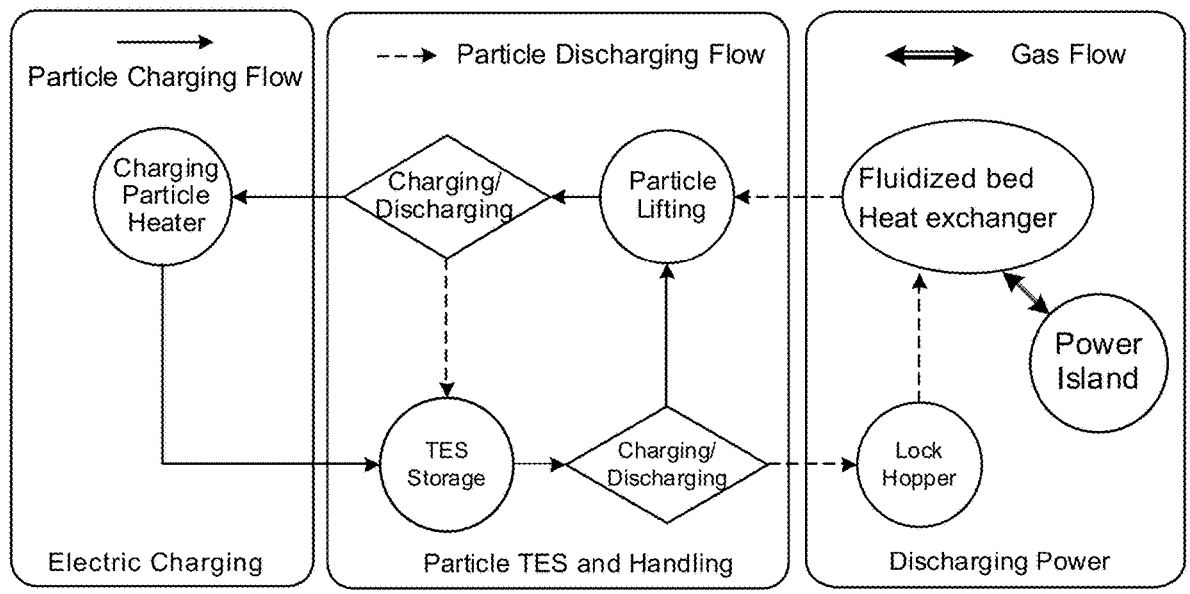
FIG. 2 illustrates a flowchart describing a method for converting electrical energy to thermal energy, and the thermal energy back to electrical energy, according to some embodiments of the present disclosure.

FIG. 2 illustrates a flowchart describing a method for converting electrical energy to thermal energy, and the thermal energy back to electrical energy, according to some embodiments of the present disclosure. As shown in FIG. 2, using electrical energy from the electricity gird (i.e., the substation 105 and supplied by the grid line 106) the particle heater 150 may "charge" the energy storage system 100 by heating the solid particles 102 ("particle charging flow"). Then the solid particles 102 may be used for thermal energy storage (TES) ("particle discharging flow") by storing the heated solid particles 102 in a silo 101. Finally, the heated solid particles 102 may be used to transfer thermal energy to a working fluid 110, such as a gas, which can be used to generated electricity ("discharging power").

Referring again to FIG. 1A, a particle heater 150 is an important component of the energy storage system 100 whose design may significantly affect the overall performance metrics of the energy storage system 100. Thus, among other things, the present disclosure describes particle heaters 150 that are very effective at heating solid particles 102 using electricity as the energy input to the particle heater 150. For example, to achieve high heat transfer rates, in order to reduce the heater size and raw materials needed (and thus reduce capital costs), an array of heating elements may be strategically arranged to maximize the heat transfer between the electric heating elements and the solid particles in contact with the electric heating element, and by directing the solid particles to the electric heating elements in a granular flow pattern. In addition, in some embodiments of the present disclosure, a large-scale particle heater 150 may be provided in a modular design to optimize operation and flow patterns through the individual heating elements while enabling redundancy in the overall particle heater 150. Methods of fabricating electric heating elements are also described herein.

Figure 1B:
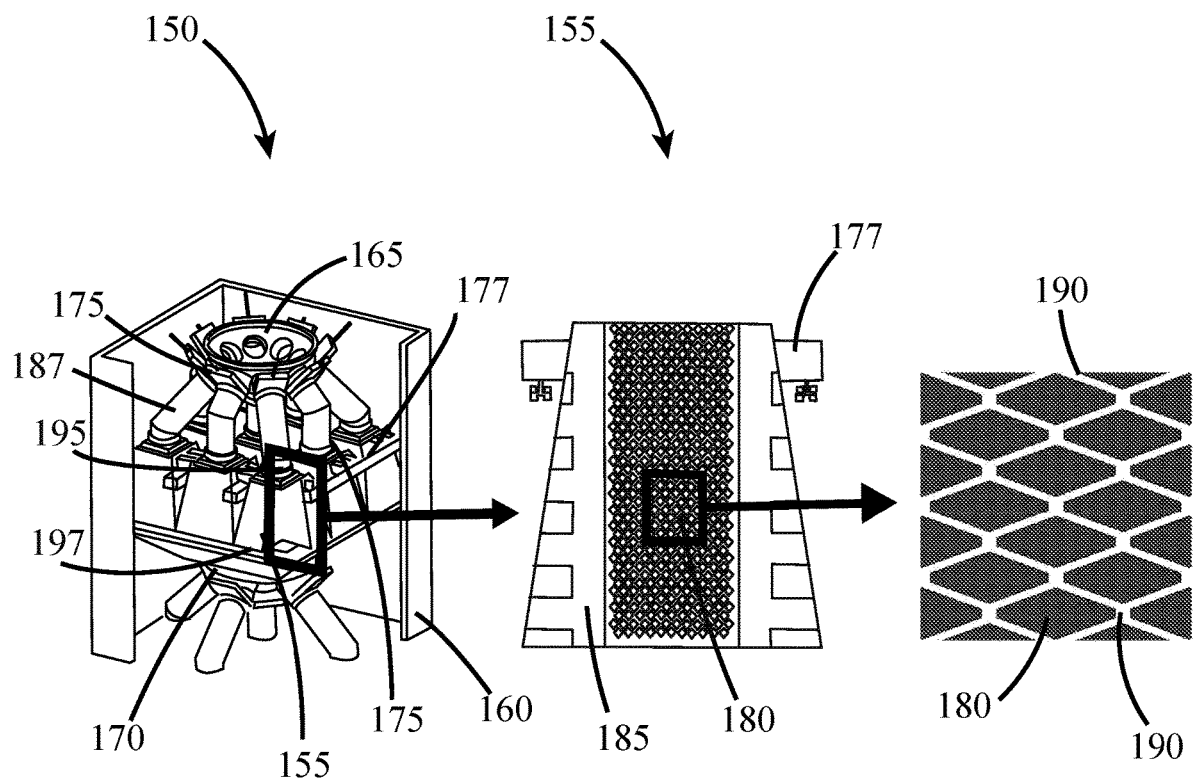
FIG. 1B illustrates a particle heater, according to some embodiments of the present disclosure.

FIG. 1B illustrates a particle heater 150, according to some embodiments of the present disclosure. In this example, the particle heater 150 contains nine heater modules 155 (only one called out by a reference number), positioned within a larger housing 160. The housing 160 may be insulated or may serve to insulate or protect the heater modules 155 from external elements. Each heater module 155 may be connected to at least one I-beam 177 (or other form of support) which not only provides structural support but may also enable quick removal of individual heater modules 155 from the particle heater 150 when necessary. Solid particles (not shown) may be directed to the particle heater 150 from a particle distributor 165, which directs the relatively cold solid particles to each of the heater modules 155 that are in use (or "on-line"). A gate-valve 175 may be utilized to turn on and turn off particle flow to a specific heater module 155, thus, enabling stepwise increases and decreases to the particle heater's 150 particle flow rate and heating rate. The heated solid particles may then exit the various heater modules 155 to fall into a particle collector 170, which may also be fitted with gate valves 175.

Referring to the center panel of FIG. 1B, each heater module 155 may be constructed of a plurality of electrically powered heating elements 180 positioned with insulation 185 (e.g., a refractory or nonconductive material) to minimize heat losses from the heater module 155 and for personnel safety. The insulation 185 may be connected directly to I-beams 177. As shown in the right panel of FIG. 1B, the heating elements 180 may create a network of channels 190 through which the solid particles 102 may flow or fall by gravity (or may be pumped or forced through), contacting the hot surfaces of the heating elements 180, resulting in the transfer of heat to the solid particles, thus completing the conversion of electrical energy to thermal energy.

Figure 1C:
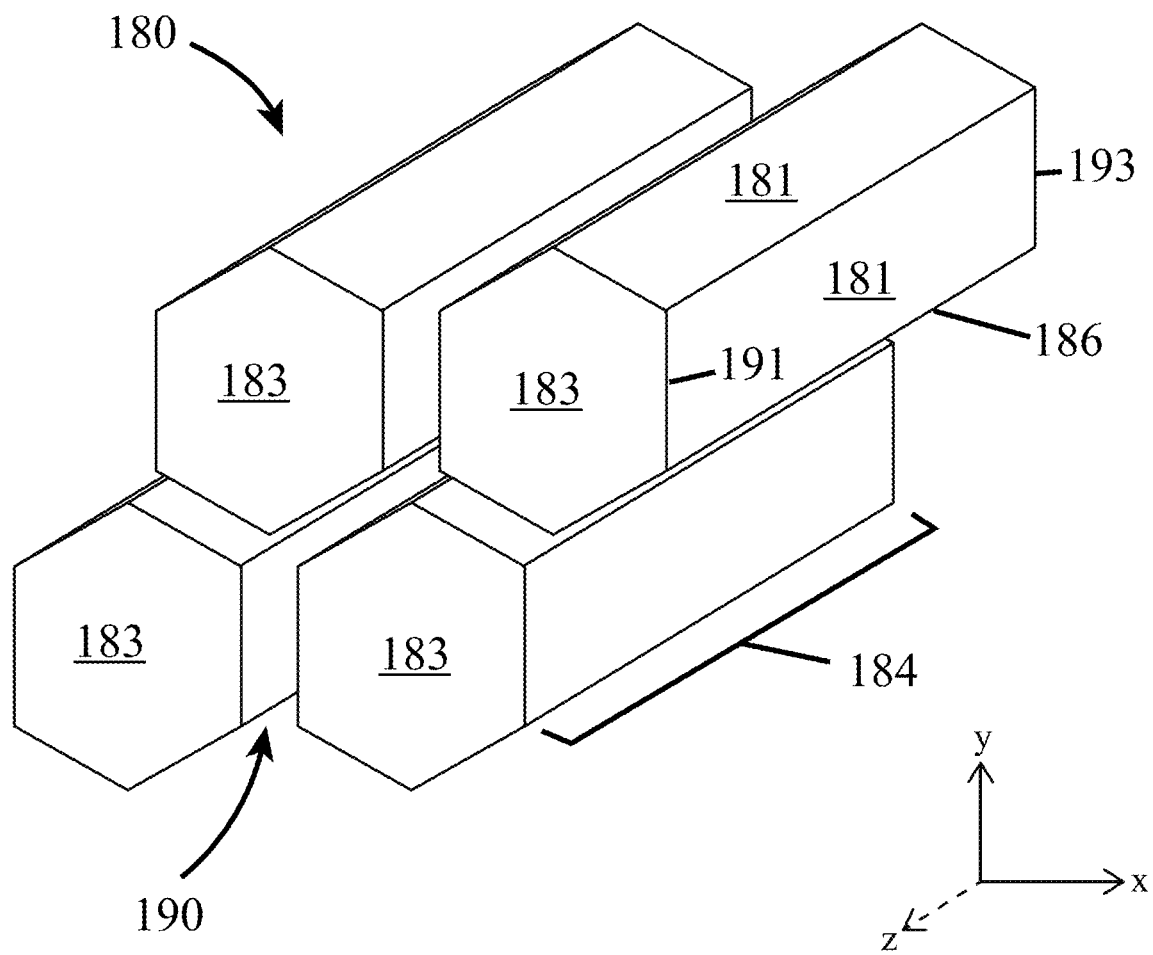
FIG. 1C illustrates heating elements which may be used in a particle heater, according to some embodiments of the present disclosure.

FIG. 1C illustrates heating elements 180, according to some embodiments of the present disclosure. The heating elements 180 may be three-dimensional (3D) shapes. Each heating element 180 may have at least two surfaces 181 with at least two lateral edges 186 positioned substantially parallel to a first axis (z). Each heating element 180 and lateral edge 186 has a length 184 between a proximal end and a distal end. Each surface has a proximal edge 191 positioned at the proximal end of the length 184 and within a first plane defined by a second axis (x) and a third axis (y). The proximal edges 191 form a cross-sectional shape 183 in the plane. At least one surface 181 of each heating element 180 is positioned to face at least one surface 181 of another heating element 180 to define a channel 190. The channel 190 is oriented to enable the gravitational flow of the plurality of solid particles through the channel 190. At least one surface 181 defining the channel 190 is configured to transfer heat to at least a portion of the plurality of solid particles (not shown in FIG. 1C). For orientation purposes, x and y are each perpendicular to z, and x and y are perpendicular to each other.

The surfaces 181 of the heating elements 180 may be substantially planar. The surfaces 181 may be convex, concave, or substantially flat (that is, not having a significant curvature). The surfaces may be capable of transferring heat (i.e., conductive) or may be capable of converting electrical energy to thermal energy (i.e., heat "generating"). The length 184 of the heating elements 180 may be substantially similar to the measurement of a heater module 155 in the z direction. That is, the heating elements 180 may substantially fill a heater module 155 in the z direction.

The channel 190 may be defined by the arrangement of the heating elements 180 within a heater module 155 and may be "negative space" (i.e., empty space). The channel 190 may be large enough that at least one solid particle 102 can flow through the channel 190 without becoming stuck. The channel 190 may curve around heating elements 180 such that the channel 190 extends in multiple directions.

In some embodiments, the cross-sectional shape 183 may have any number of sides. In some embodiments, the cross-sectional shape 183 may a polygon having substantially straight sides. The polygon may be a triangle, a quadrilateral, a pentagon, a hexagon, a heptagon, an octagon, a nonagon, decagon, or n-gon (where n is an integer). The polygon may be regular polygon being substantially equilateral (i.e., having size of approximately equal length) and/or equiangular (i.e., having interior angles of approximately equivalent angles). The polygon may be irregular, having sides of varying length and interior angles of varying degrees. In other embodiments, the cross-sectional shape 183 may be a Reuleaux polygon have at least one side which is not substantially straight. The Reuleaux polygon may be a regular Reuleaux polygon with curves of constant width formed by a finite number of circular arcs of equal length or may be an irregular Reuleaux polygon with curves of varying width based on a finite number of circular and/or non-circular arcs of varying lengths. In some embodiments, the cross-sectional shape 183 may be a multi-sided shape with some curved sides and some substantially straight sides.

Figure 1D:
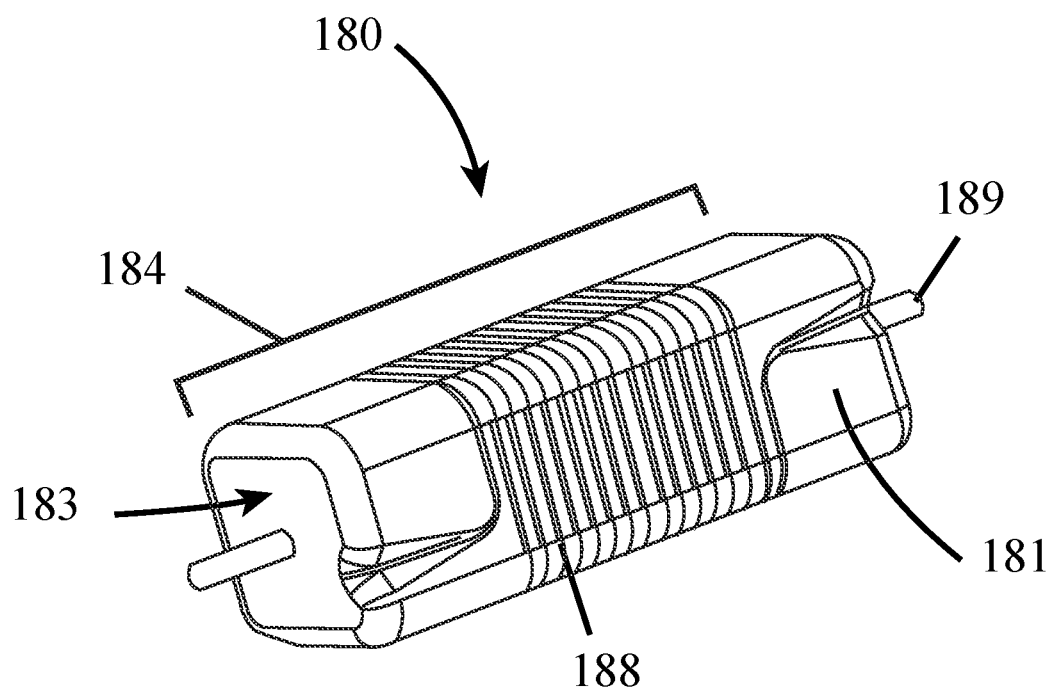
FIG. 1D illustrates an exemplary heating element which may be used in a particle heater, according to some embodiments of the present disclosure.

FIG. 1D illustrates an exemplary heating element 180, according to some embodiments of the present disclosure. The exemplary heating element 180 has a cross-sectional shape 183 of a square with curved corners. An indentation 188 wraps around the heating element 180 multiple times to allow a wire, bar, or other resistive heating element (not shown) to be placed within the indentation 188. A support 189 extends through both the proximal end and distal end of the heating element 180 and may be used to align the heating element 180 in the heater module 155. The exemplary heating element 180 may be made primarily of a conductive material to allow for heat to be transferred from the resistive heating element to the solid particles 102 (not shown).

Electricity storage by thermal energy storage (TES) may use energy storage media (i.e., solid particles) capable of remaining stable over the desired operating temperature range, and ideally capable of demonstrating superior fluidization and heat-transfer properties. Table 1 shows a summary of four potential solid particle materials, and relevant properties. These potential solid particles may be screened based on their stability at temperatures greater than 1,100° C., relative energy densities, cost of acquisition and particle preparation, and regional abundance. A plurality of solid particles or solid particle flow 102 as described herein may include any combination of energy storage media or other similar media options.

TABLE 1

Relevant properties for potential storage media

| | | Media Properties | | |
|---|---|---|---|---|
| ID | Media | Density (kg/m3) | $C_p$ (J/kg-K) | Melting T (° C.) |
| 1 | Coal (fly) ash | ~2,000 | 1,098 | 1,183–1,640 |
| 2 | Silica sand (β-quartz) | 2,650 | 1,155 | 1,710 |
| 3 | Calcined flint clay | 2,500 | 1,050 | 1,500 |
| 4 | Brown fused alumina | 3,950 | 1,321 | 2,000 |

Figure 3:
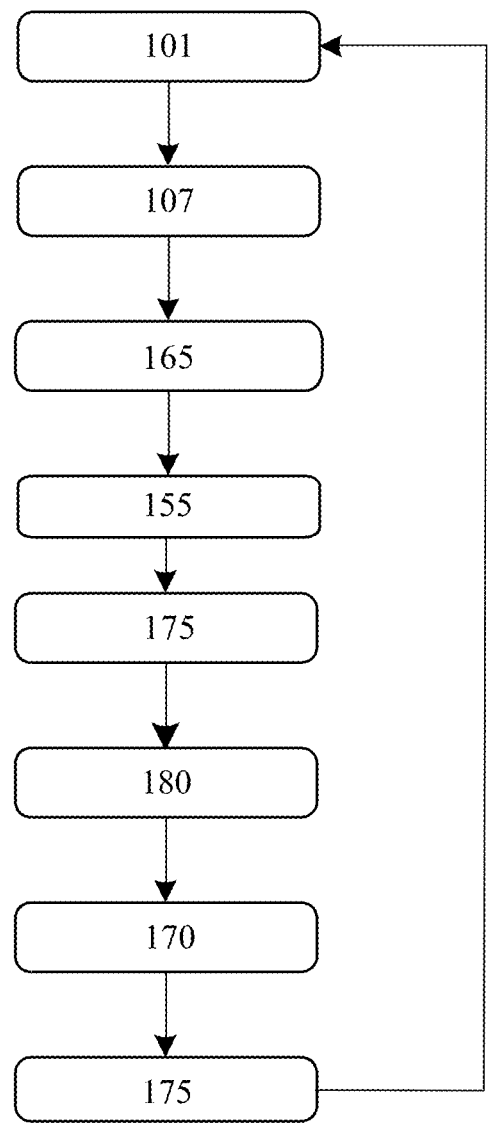
FIG. 3 illustrates a process flow diagram of the flow of solid particles through the electric charging process, according to some embodiments of the present disclosure.

FIG. 3 illustrates a particle flow diagram for the "charging" step (i.e., electrical heating of the solid particles using the energy storage system 100) according to some embodiments of the present disclosure. In this example, relatively cool solid particles may be removed from a storage silo 101 and transported through a particle lifting device (a skip hoist in this example as a particle conveyor 107) to the top of the particle heater 150. The solid particles 102 may then be distributed (through a particle distributor 165) to various inlets of the heater modules 155 of the particle heater 150 to be contacted (e.g., by flowing gravitationally) with the various heating elements 180. The heated solid particles 102 may then flow through a control valve 175 to a designated storage silo 101. For the energy "discharging" step, (i.e., conversion of the solid particles' thermal energy to electrical energy) the heated solid particles 102 may be directed to a heat exchanger, (e.g., a pressurized fluidized bed heat exchanger 111) to be contacted with and heat compressed air delivered from a turbine 103 that that then utilized the heated air to drive the turbine 103 to generate electrical power. In some embodiments of the present disclosure, a particle heater 150 may have a modular design that can be adapted to suit various commercial scales. In addition, the particle heaters 150 described herein were designed to be constructed from commercially available, high temperature materials from among other industries, including the refractory industry.

Heat transfer from a surface to a solid particle depends strongly on both particle-surface and particle-particle interactions including particle-surface contact, particle mixing, particle flow regime, and particle thermal properties. Improving the particle-surface heat transfer in a particle heat exchanger 150 is beneficial because the particle-surface heat transfer (i.e., heat transfer between solid particles 102 and a surface 181 of a heating element 180) controls the overall particle heater 150 size and cost. The particle-surface heat transfer largely depends on the design of the particle flow regime.

Electric charging particle heater design innovations described herein include:
  Modular particle heaters for rapid response to input charging power variations
  Aiming at a high-efficiency, low-cost design
  Low-cost materials for low-cost charging heater
The lower cost results in the electric particle heaters described herein having charging capacities that can be larger than the power generation capacity of the system. This means the energy storage system can store large amounts of electricity in a short period time for a very low price.

Figure 5:
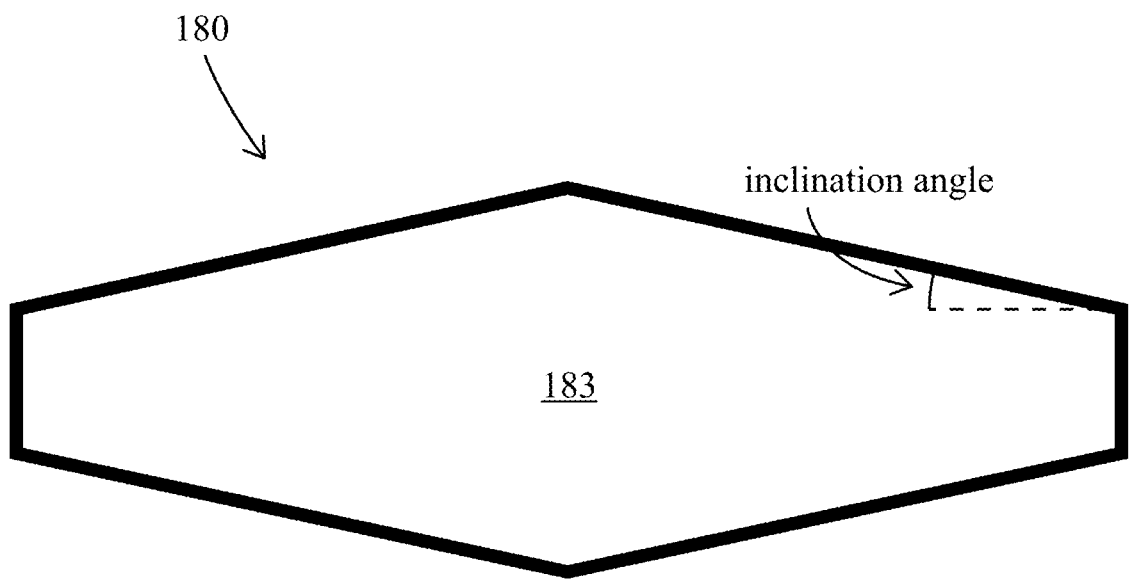
FIG. 5 illustrates a cross-sectional shape of a heating element showing the location of an interior inclination angle, according to some embodiments of the present disclosure.

In some embodiments of the present disclosure, a particle heater may be designed in modular sections (e.g., a three-by-three modular assembly as shown in FIG. 5). Such a modular heater design has several practical as well as novel features compared to a single, 300-MW heater design. An individual heater module may be swapped in and out for maintenance while other modules remain functional.

In some embodiments of the present disclosure, the individual heater modules 155 of a particle heater 150 may be operated at fixed design conditions (e.g., fixed electrical power input, mass flow rate, inlet temperature and/or outlet temperature) for a fixed electric charging load. By turning on/off individual heater modules 155, a complete particle heater 150 constructed of multiple heater modules 155 may follow the available electrical load in a stepwise ramping manner (e.g., changing electrical charging loads may be matched by turning one or more individual heater modules on or off, as needed). For instance, in the case of the design shown in FIG. 1B, a particle heater 150 may be designed to accommodate nine discrete electrical charging loads by providing nine discreet heater modules to match the discrete electrical loads. However, nine heater modules 155 are chosen for illustrative purposes only and different applications may have more or fewer heater modules 155, depending on each application's specific needs. Each individual heater module 155 may operate at uniform design conditions and may be optimized for a single solid particle flow rate and electric charging load to achieve the designed outlet temperature for the solid particles. Among other things, these load following steps simplify the charging control mechanism and particle flow control, while ensuring that the heaters will always run under optimal conditions.

In some embodiments of the present disclosure, heater modules 155 may be supported on I-Beam rails, which may be subsequently attached to an external support structure. The individual heater modules may then be rolled out of the assembly enclosure for repair or maintenance, without removing the entire particle heater, with all of its individual modules, from service. I-Beam rails may be attached to an external support structure. In some embodiments of the present disclosure, refractory, the first insulation layer of the individual heater modules, may be cast with support structures that transfer the structural load to the metal support rods on the outside of the metal casing (i.e., refractory 185 in center panel of FIG. 1B).

In some embodiments of the present disclosure, the temperature of a solid particle may increase continuously when flowing/falling through and contacting the heating elements 180 contained in a particle heater 150 to reach a target temperature (e.g., 1,200° C.). Solid particle recirculation for additional heating may not be needed with sufficient heating provided by the heater modules 155 of a particle heater 150 after one pass through the heater modules 155. Among other things, this eliminates any need for mechanical complexities for transporting the solid particles at high temperatures. Thus, in some embodiments of the present disclosure, heated solid particles 102 may fall into a hopper and the flow may be controlled by gate valves 175 to subsequently guide the solid particles 102 into a designated storage silo 101.

An enclosure (i.e., housing 160) may be provided to house the electrical connections needed for the heating elements 180. To keep the particle heater 150 temperature within the allowable temperature ranges of the structural, electric cables, etc., each heater module 155 may be insulated to maintain a temperature inside the housing 160 but outside of the particle heater 150 below at an acceptable set-point (e.g., about 350° C.). The housing 160 may provide insulation to separate the external structures from the high temperatures of the heating elements 180 within the heater modules 155. Also, housing 160 prevents heat loss from an active heater module 155 (i.e., electrically heating solid particles 102) to an inactive heater module 155 (i.e., turned "off" and not supplying heat to solid particles 102), for example, during partial load charging scenarios. The housing 160 of the particle heater 150 assembly may be further insulated from the ambient conditions. A preliminary thermal analysis of the housing 160 design for a single heater module 155 has been conducted and is presented herein.

As described herein, a particle heater (constructed of two or more heater modules) may include three sections through which the solid particles may flow: 1) a distributor, 2) heater module, and 3) collector. In some embodiments of the present disclosure, a distributor may use a gate valve to control which heater module(s) receives the relatively cool solid particles at, for example, about 300° C. Each heater module may contain hundreds of individual heating elements. As described above, each the individual heating elements of a heater module of a particle heater heat the solid particles to a target temperature (e.g., about 1,200° C.). A single collector may then collect the heated solid particles from each of the heater modules to subsequently direct them to one or more insulated storage silos using gate valves.

The individual heating elements within a heater module may be tasked with supplying the thermal power necessary to heat the solid particles. A full, commercial-scale heater may need to be able to consume in excess of 300 MWe of electrical energy. Table 2 summarizes some key design parameters for a heater module, according to some embodiments of the present disclosure. These parameters were calculated using a heat-mass balance; the solid particle flow and heat transfer modeling using discrete element methods is introduced below. The values summarized in Table 2 serve as good starting design points, and are not necessarily fixed (e.g., the particle mass flux per inlet area could range from 40-60 kg/s-m$^2$), and may change depending on specific applications, climates, etc.

corners) with four surfaces 181. The wire is in contact with each surface 181 such that each surface 181 can facilitate heat transfer to solid particles 102. The lower panel shows an exemplary arrangement of heating elements 180 arranged to form channels 190. The heating elements 180 are arranged such that while flowing through the channels 190 the solid particles 102 may be in contact with at least one surface 181 with a resistive heating element (i.e., a wire or a metal bar) for heating of the solid particles 102. In some instances, the solid particles 102 may be in between two surfaces 181 which both may be capable of transferring heat from the resistive heating element to the solid particles 102.

FIG. 5 illustrates a cross-sectional shape 183 at an end of a heating element 180 showing an interior angle, which may also be referred to as an inclination angle. The inclination angle may be measured from the horizontal and may be at the intersection of two proximal edges 191 or two distal edges 193. The inclination angle may impact the flow of solid particles 102 through the channel 190 (not shown). The higher the inclination angle, the steeper the channel, and the lower the inclination angle, the less steep the slope of the channel.

Figure 6:
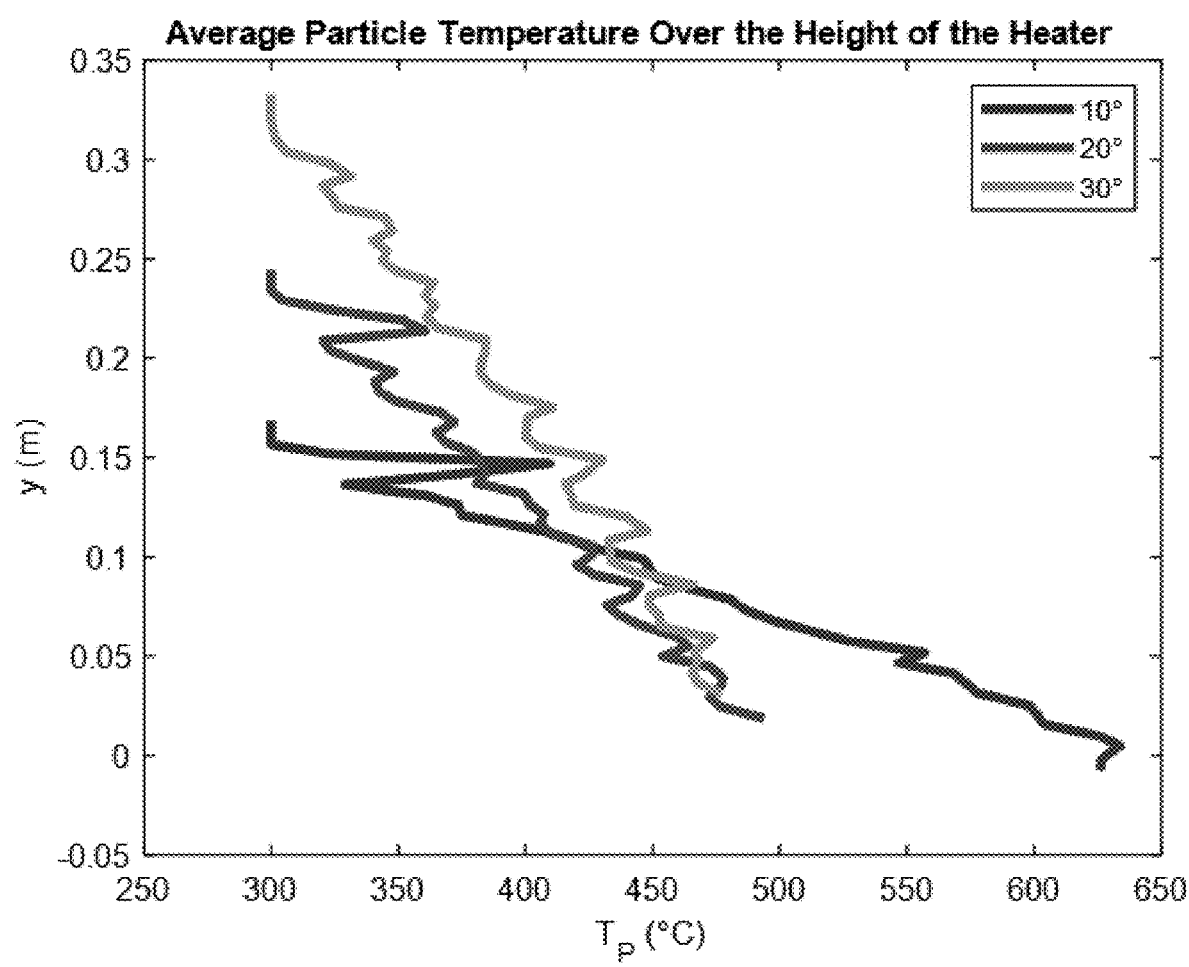
FIG. 6 illustrates average solid particle temperatures (x-axis) for different inclination angles of heating elements at various vertical positions (y-axis, particles flow from the position to negative y-direction), according to some embodiments of the present disclosure.
Figure 7:
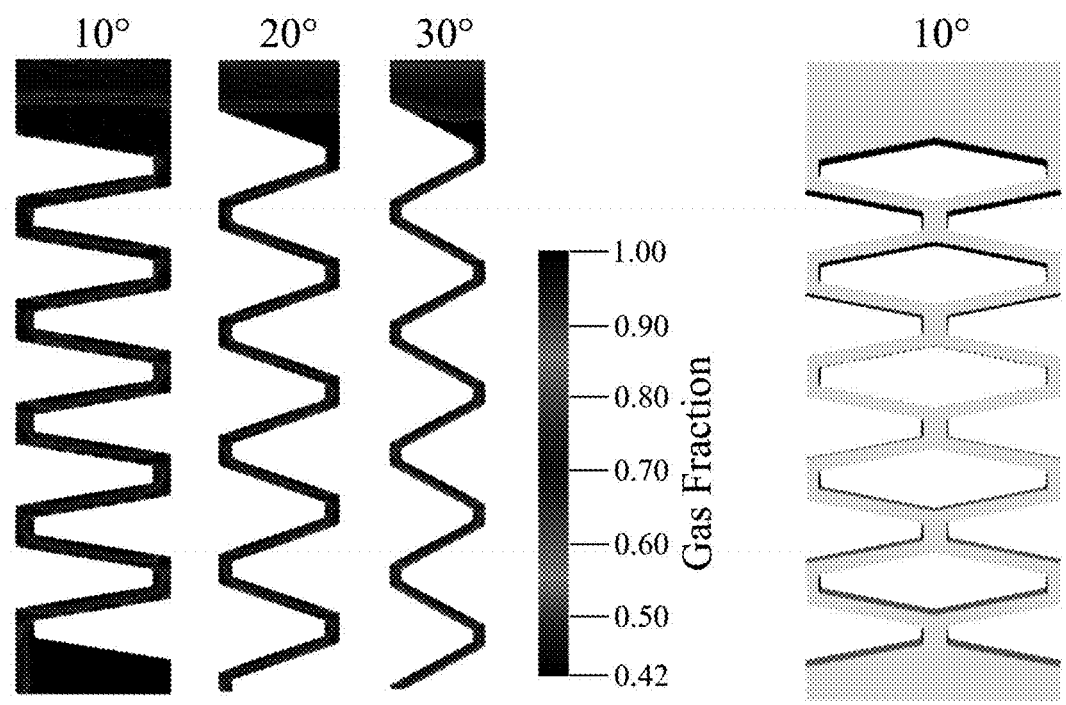
FIG. 7 illustrates modeling results of contours of the gas fraction (1.00 meaning no particles, 0.42 meaning packed bed) throughout the modeled domain for different inclination angles, according to some embodiments of the present disclosure. Grey contour shows the full solid particle domain for a 10° geometry.

A particle diameter of silica sand of 450 microns (μm) was used as solid particles 102 in the simulation; the simulations did not consider the effects of polydispersity of solid particle size distributions. Two parameters were investigated to maximize the heat transfer from the heating elements 180 to the solid particles 102: surface angle and friction. FIG. 6 shows the temperature rise (positive x-axis) as the solid particles descend through the heater module 155 (negative y-axis) as well as the effect of the inclination angle of the heating elements 180 on particle temperature rise. The inclination angles explored were 10°, 20°, and 30° measured from the horizontal. The gray sketch in FIG. 7 shows the full

TABLE 2

Exemplary design parameters for a commercial-scale heater module.

| Parameter | Variable | Value | Units | Notes/Equations |
|---|---|---|---|---|
| Particle mass flux per inlet area | m" | 40 | kg/s-m$^2$ | 40-60 range possible |
| Module heater inlet area | $A_i$ | 1.0 | m$^2$ | Chosen |
| Total heater inlet area | $A_{tot}$ | 9.0 | m$^2$ | 9 modules |
| Module heater inlet mass flow rate | $m_i$ | 40 | kg/s | $m_i = m"A_i$ |
| Total heater inlet mass flow rate | $m_{tot}$ | 360 | kg/s | $m_{tot} = m"A_{tot}$ |
| Temperature change | ΔT | 900 | K | ΔT = (1200-300)° C. |
| Module heater thermal power | $P_i$ | 41.56 | MWt | $P_i = m_i C_p ΔT$ |
| Total heater thermal power | $P_{tot}$ | 374.06 | MWt | $P_{tot} = M_{tot} C_p ΔT$ |
| Number of heating elements | $N_{el}$ | 774 | — | From Solidworks |
| Module heating element thermal power | $P_{el}$ | 53.70 | kWt | $P_{el} = P_{tot}/N_{el}$ |
| Thermal power per element length | $P'_{el}$ | 53.70 | kWt/m | $P'_{el} = P_{el}/(A_i^{0.5})$ |

Particle flow and heat transfer through heater modules and past heating elements were modeled as described below. Among other things, the particle flow patterns through arrays of heating elements determine the particle flow rates, residence times, heat transfer, and energy absorption. The heat transfer in a moving bed was analyzed by using a discrete element method (DEM) model developed in MFIX (Multiphase Flow Interface eXchange Model), a commercially available software tool.

Figure 4:
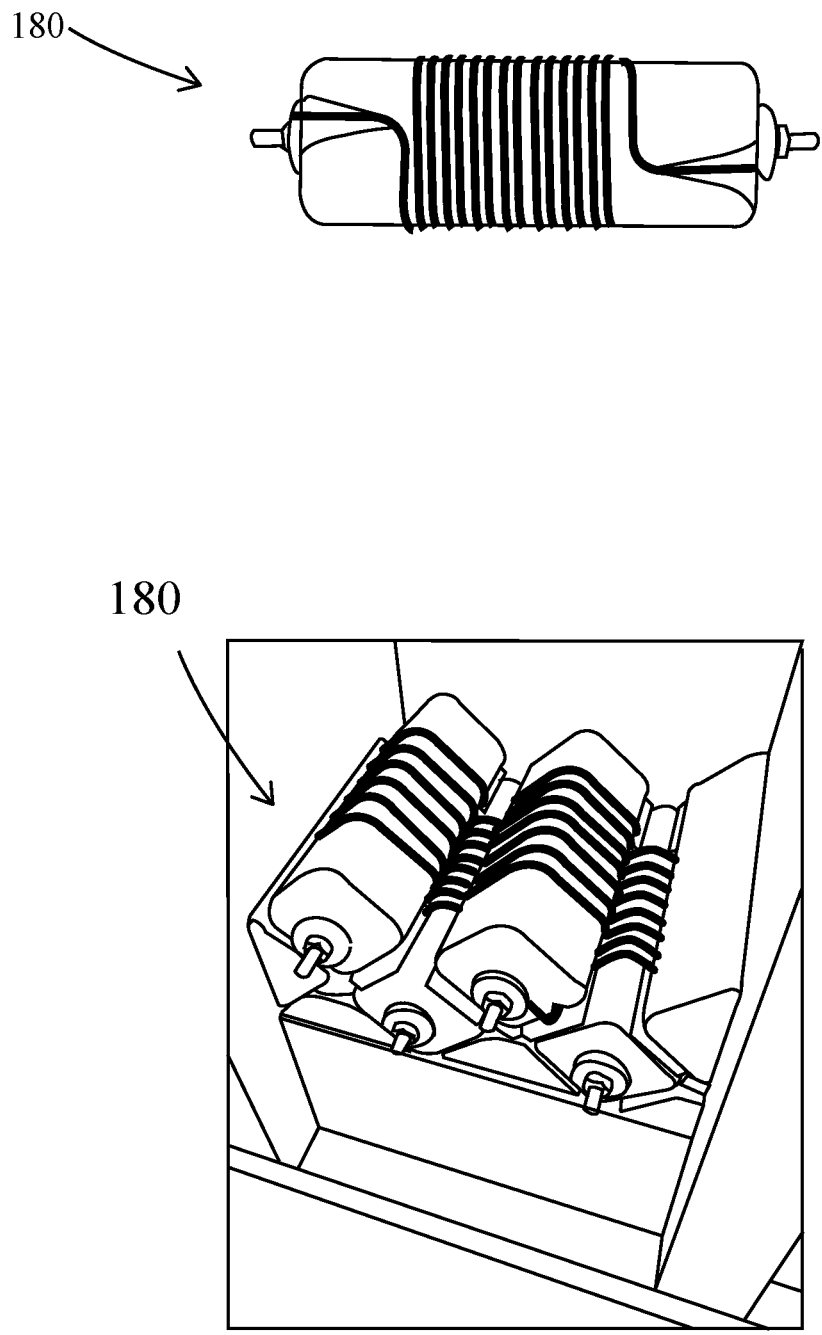
FIG. 4 illustrates photographs of exemplary heating elements, according to some embodiments of the present disclosure.

FIG. 4 illustrates photographs of exemplary heating elements 180, according to some embodiments of the present disclosure. The upper panel shows an exemplary heating element 180 of a refractory material wrapped in a wire for resistive heating. The heating element 180 has a cross-sectional shape 183 of a hexagon (or a square with curved particle domain with a 10° heater inclination angle. For the simulations, the cross-sectional shapes 183 were cut in half along the center vertical symmetry line to reduce the computational requirement. In the shaded contours shown in FIG. 7, the solid particles 102 can be seen flowing along the surfaces 181 of the heating elements 180. This is a key takeaway from this simulation as it demonstrates hexagonal cross-sectional shapes 183 of heating elements 180 can effectively control the solid particle flow and heat transfer to the solid particles 102.

The solid particle mass flux through the particle heater 150 configuration may increase with increasing inclination angle; the inclination angles of 10° and 30° had a solid particle mass flux of 39 and 91 kg/m$^2$-s, respectively. Consequently, the residence time of the solid particles 102 in a domain with a larger inclination angle is shorter; thus, the solid particles 102 experience less of a temperature rise for the same number of heating elements 180. This effect is shown in FIG. 6. Because the residence time is much longer for an inclination of 10° in the heating elements 180, the solid particles reached higher temperatures in a shorter distance than the 20° or 30° configurations. In each of these initial simulations, only several rows of heating elements 180 were modeled (each row has two heating elements 180 forming a single channel 190 with a height of about 0.3 m) whereas the actual particle heater 150 may have many more rows of heater elements 180 and/or heating elements 180 of a different size that what was modeled. For example, in some embodiments, the particle heater 150 may have about ten to fifty rows of two heating elements 180 and/or a height of about 2 m to about 4 m. In some embodiments, the heating elements 180 may be arranged in rows having more than two heating elements 180. An analytical method was used that will be introduced below to use the results from this DEM simulation of a short section of heating elements 180 to predict the temperature rise for a full-size particle heater 150. For solid particles 102 with particle diameters of about 250 μm the inclination angle may be about 70°.

Table 3 shows how the inlet solid particle mass flux, solid particle mass flow rate, solid particle temperature rise, and solid particle residence time vary with inclination angle. As was discovered, the lowest inclination angle (10°) had the highest solid particle residence time and the quickest solid particle temperature rise. Although a rapid solid particle temperature rise is desirable, it is critical to avoid stagnant regions or jamming that may occur for slow moving solid particle 102 flows.

TABLE 3

DEM simulation key parameters and results for varying with inclination angle

| Inclination Angle (°) | 10 | 20 | 30 |
|---|---|---|---|
| Inlet Solid Particle Mass Flux (kg/m2-s) | 39 | 65 | 91 |
| Total Solid Particle Mass Flow Rate (kg/s) | 0.0045 | 0.0139 | 0.0168 |
| Solid Particle Temperature Rise (° C./m) | 1757 | 851 | 561 |
| Residence Time on One Heating Element (s) | 0.0634-0.127 | 0.0443-0.0998 | 0.0433-0.0866 |

These simulations reveal that solid particle 102 residence time is important for maximizing the temperature rise of the solid particles 102 in a particle heater 150. The solid particle 102 residence time is defined as the length of one heating element 180 divided by the minimum and maximum solid particle velocity across one heating element 180. At lower (i.e., shallower) inclination angles, the residence time increases and results in period of thermal contact between the solid particles 102 and the surface 183, resulting in adequate temperature rise. To assess the tradeoff between residence time and potential flowability issues (e.g., jamming), a friction coefficient was parametrically studied. In some embodiments, the inclination angle may be in the range of about 5° to about 75°. Friction was investigated because the solid particle flow properties are critical to the solid particle heat transfer process. It is possible that friction may reduce the residence time, and increase heat transfer, but the resultant flowability of the solid particles 102 may be a concern. The solid particle-solid particle and solid particle-surface friction coefficient, μ, evaluated were zero (0), 0.15, and 0.30.

Figure 8:
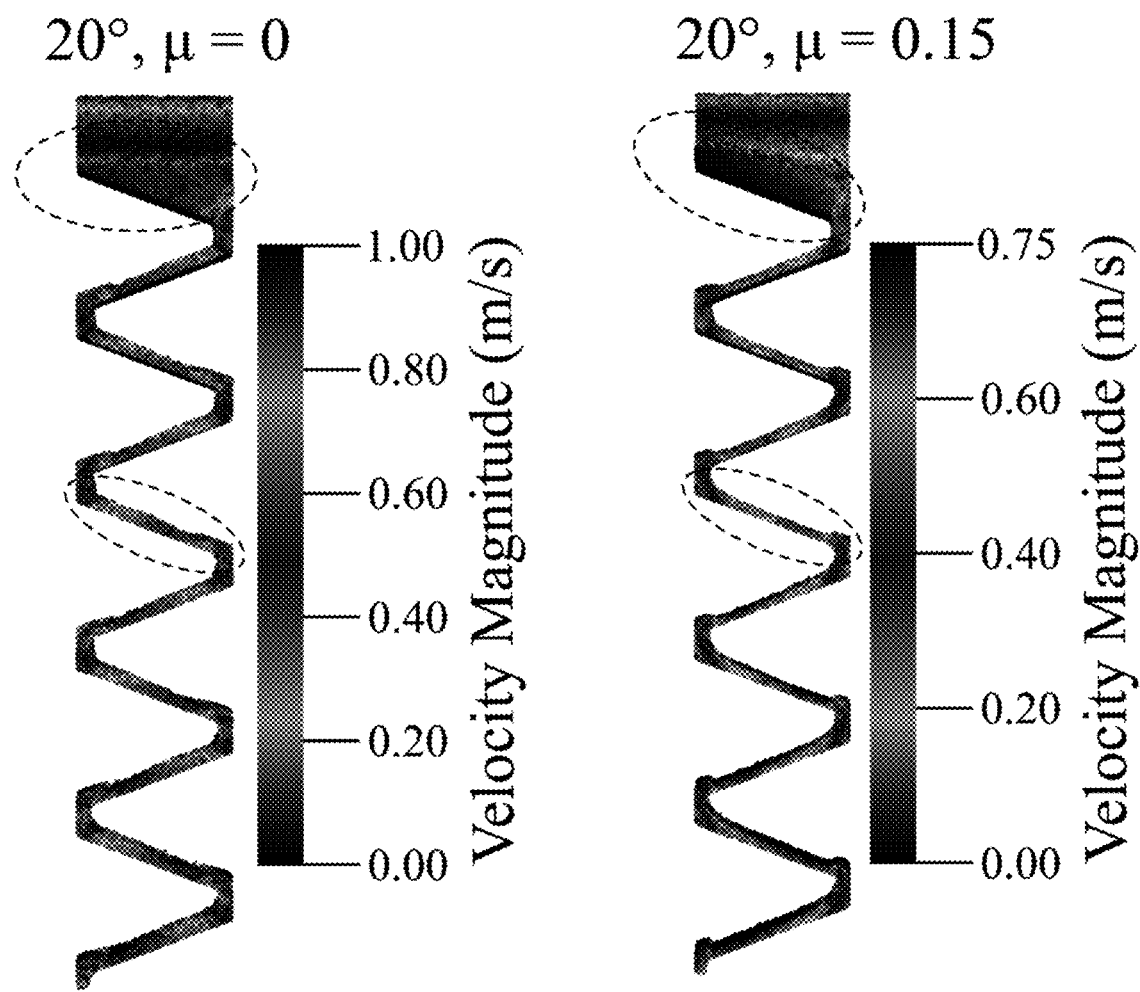
FIG. 8 illustrates discrete element method (DEM) simulation results of solid particle velocities for a no friction case and a 0.15 friction case, according to some embodiments of the present disclosure.
Figure 9:
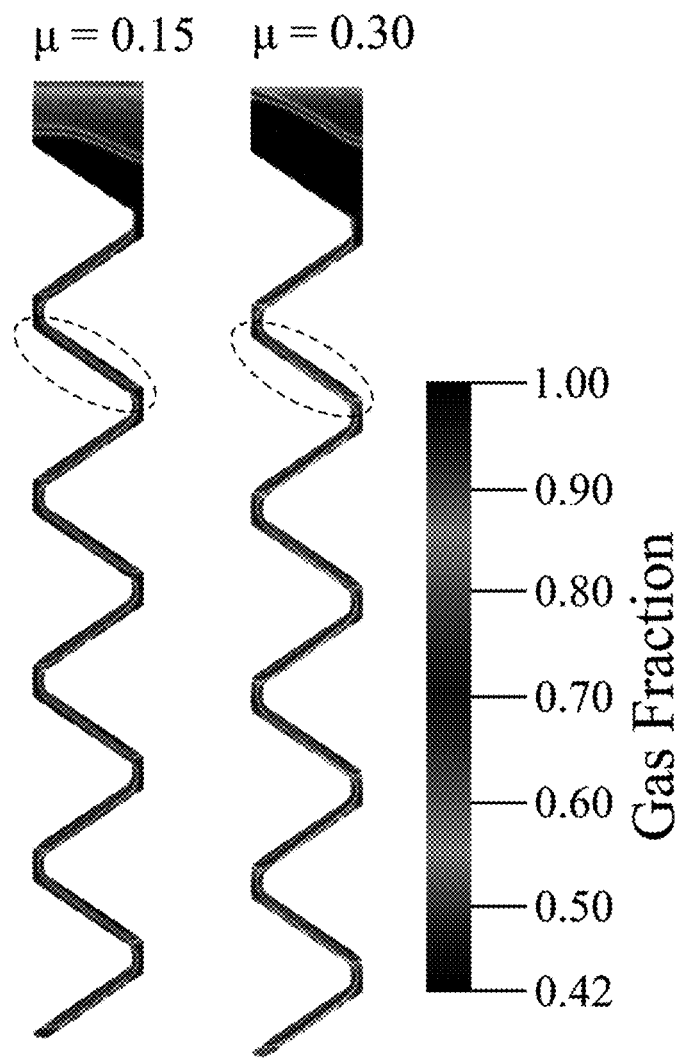
FIG. 9 illustrates DEM results of gas fractions in a 30° heater with two different friction coefficients, according to some embodiments of the present disclosure.

FIG. 8 shows that friction may impede the flow on the top row (i.e., slower velocity in the top row of the case with friction applied versus exact same case with no friction applied), but this change in impedance does not appear in subsequent rows of heating elements 180. FIG. 8 shows the same heater geometry and inlet conditions, but the left has no friction, and the right has a solid particle-solid particle and solid particle-surface friction coefficient of 0.15. As the friction increased, the solid particle 102 flow through the initial row of heating elements 180 became restricted and the subsequent flow through the lower heating elements 180 became more dilute. FIG. 9 shows the difference in gas fraction between simulations with varying friction coefficients. As described above, in some embodiments of the present disclosure, the shape of a heating element 180 may have a cross-sectional shape 183 of a substantially hexagonal shape to enhance the solid particle-surface contact and solid particle-solid particle mixing. The shape and size of the heating elements 180, as well as the layout of the heating elements 180 control the solid particle flow, heat transfer, and heating load. In some embodiments of the present disclosure, a solid particle-surface heat transfer coefficient of about 500 W/m² K may be targeted. A high heat transfer coefficient is important because it is necessary to ensure the solid particles cool the heating elements 180 effectively in order to enable high power output.

Figure 10:
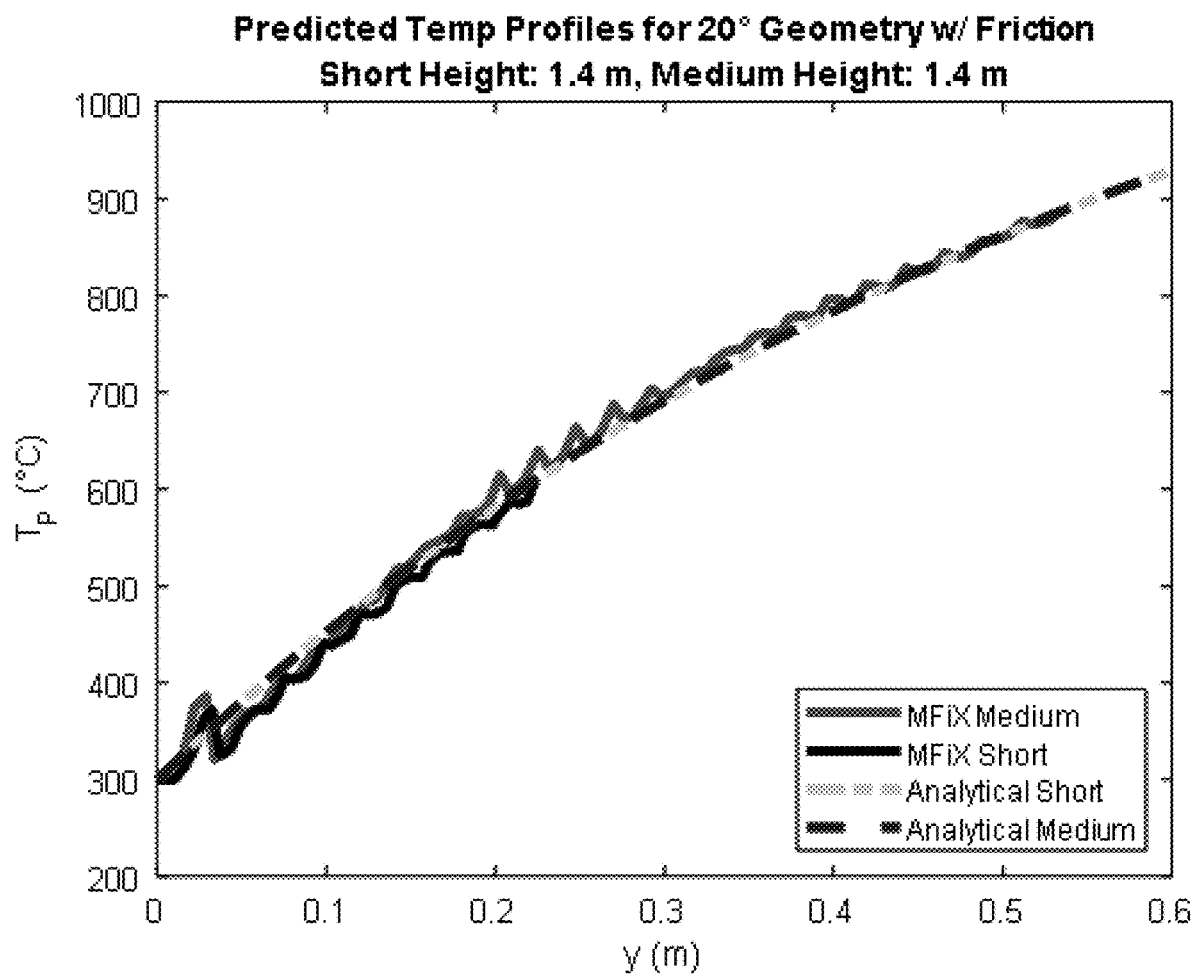
FIG. 10 compares the results obtained from an analytical model for a short and medium height simulations of a heater module, according to some embodiments of the present disclosure. Also shown are the DEM solid particle temperature curves to verify the analytical model follows.

As previously discussed, to efficiently obtain results from DEM, the simulations were limited to relatively small-scale simulations. A reduced order analytical model was developed and approximations for the heat transfer coefficient were obtained from discrete heating element 180 simulations. The analytical model was verified by comparing the analytical temperature profile and predicted product height for both a small-scale (i.e., a particle heater 150 of about 23.5 cm in height) and a medium-scale simulation (i.e., a particle heater 150 of about 47 cm in height). This predicted product height is defined as the height at which, based on the analytical model, the solid particles reach a target temperature of approximately 1,200° C. In some embodiments, the target temperature may be between about 1000° C. and 1300° C. FIG. 10 shows the simulation results for comparison.

Figure 11:
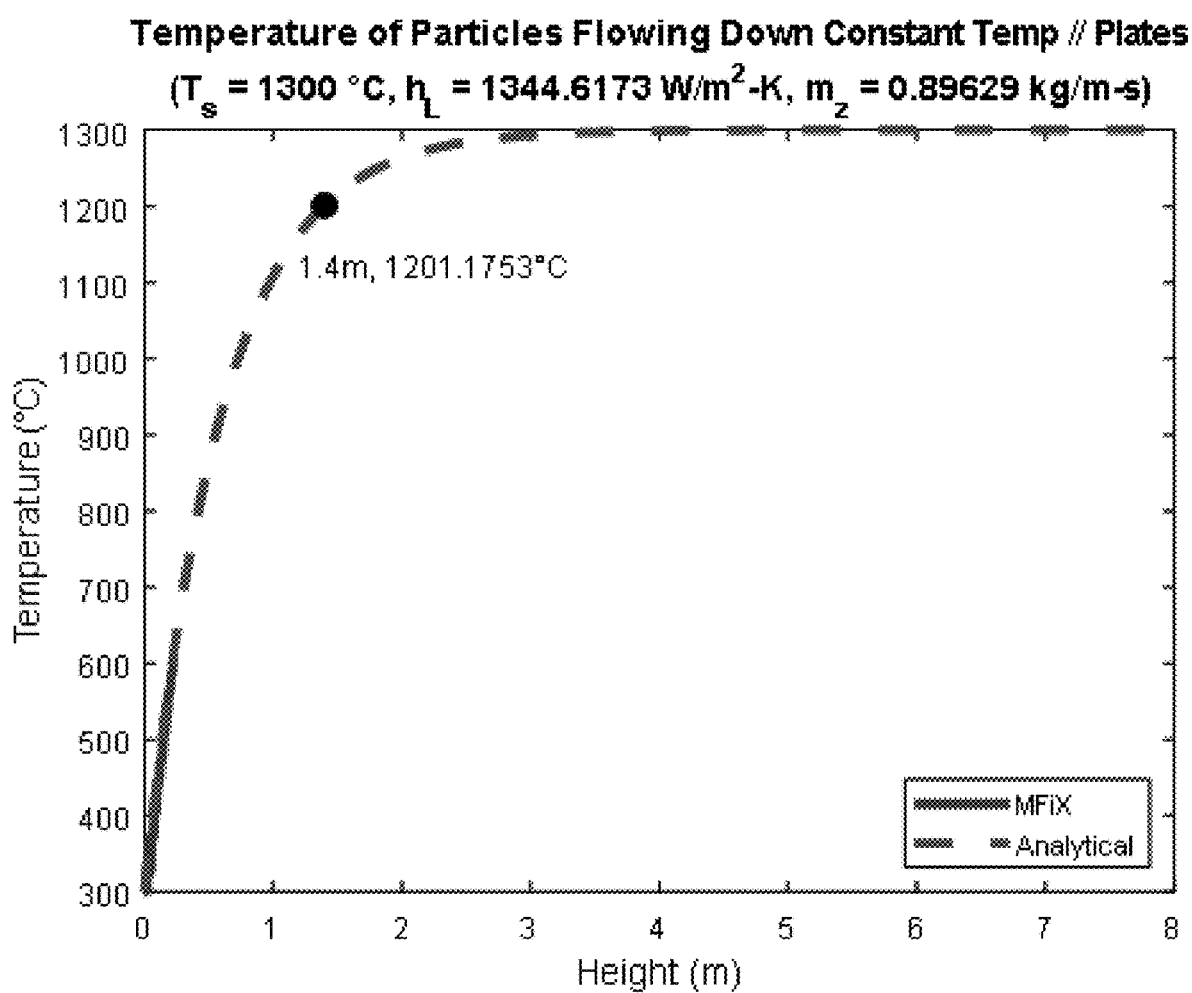
FIG. 11 demonstrates results from an analytical model of the analytical temperature profile of a taller particle heater height based on the DEM simulation results obtained for a shorter particle heater, according to some embodiments of the present disclosure. The point marks the predicted height of the heater required to reach a target temperature of approximately 1,200° C.

As can be seen, the analytical temperature profiles and predicted heights closely match. The analytical model is based on DEM simulation results, so there was no adjusting of parameters to make the profiles match; it happened naturally. Since the analytical profiles both followed the DEM results and matched between a small and medium simulation, the analytical model was verified. This validates that the model could be used to expand from small-scale results to the large-scale design considerations. Some large-scale results resulting from the analytical model being used to model solid particles temperatures over much larger heights are shown in FIG. 11.

Figure 12:
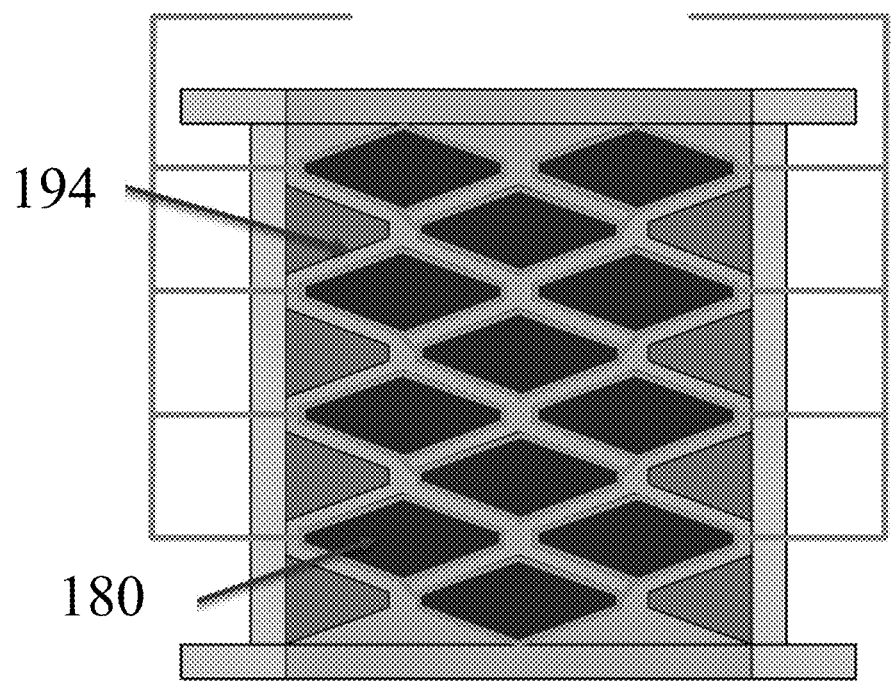
FIG. 12 illustrates features of exemplary heating elements designed for a heater module, according to some embodiments of the present disclosure.

The heating elements 180 are the smallest units that convert electric power into thermal energy thereby heating the solid particles 102 in a particle heater 150. Thus, among other things, the size and shape of the heating elements 180 may determine solid particle flow and heat transfer and are the important design parameters in modeling, testing, and optimizing a particle heater 150 design. In some embodiments of the present disclosure, a wire-wrapped heating element 180 may be used (as shown in FIG. 4). Among other things, this design makes it easy to change shape and size compared to other heating element 180 designs such as molded ceramic or silicon carbide (SiC) heating elements 180 that may also be used in commercial-scale units. To achieve mass production, low-cost and highly reliable product heating elements 180 can incorporate other high-temperature resistor heaters. In some embodiments, the heating elements 180 can directly use refractory materials as a resistor heater, which can simplify the particle heater 150 design and eliminate the need for a heating wire (shown as wire 194 in FIG. 12). A backing material may support wires in the shape of rods that are capable of very high temperatures (e.g., to 1,600° C.). Some refractory materials have been tested for their compatibility with silica solid particles. Features of exemplary heating elements are shown in FIG. 12.

Candidate materials for the heating element 180 resistive heater components include nickel-chromium (NiCr) wires or bars, Kanthal or iron-chromium-aluminum (FeCrAl) wires or bars, SiC wires or bars, and Molybdenum Disilicide (MoSi$_2$) wire or bars. Factors considered when selecting materials of construction for heating wires include usable temperature ranges, atmosphere conditions, life, power, and heat load requirements.

FeCrAl
  Maximum temperature approximately 1,400° C.
  Inexpensive, rugged (mechanical/thermal shock)
  Little problem with thermal cycling
    Lower hot strength, reduced ductility, and embrittlement with use.
  Wire, strip, rod (i.e., bar) forms
SiC
  Maximum temperature approximately 1,700° C., relatively low power (W/cm$^2$)
MoSi$_2$ (Molybdenum Disilicide)
  Maximum temperature approximately 1,800° C., relatively high power (W/cm2)
Other factors to consider when selecting heating wire materials include:
  For long life, low head temperature (so lower Watt loading) with respect to furnace temperature. This requires more elements in furnace (and thus, takes more space).
  Heater power load is limited by the allowable temperatures.
  Furnace process temperature is often limited by furnace wall material Table 4 lists potential candidates that may be used as resister heater materials (for use as or in conjunction with heating elements 180) to heat solid particles 102 above 1,200° C.

TABLE 4

Candidates of resistance heating materials

| | Material | Maximum heating capacity (W/cm$^2$) | Max usable temperature in air (° C.) |
|---|---|---|---|
| NiCr wire | NiCr | 9 | 1,200 |
| FeCrAl wire | FeCrAl | 11 | 1,400 |
| SiC heater | SiC | 14 | 1,700 |
| Molybdenum Disilicide | MoSi$_2$ | 30 | 1,800 |

There are at least two designs for electrical resistance heating of the solid particles 102. As mentioned, one design is to have heating elements 180 constructed of heating wires (FeCrAl wire) wrapped around a refractory bar in the desired cross-sectional shape 183 to obtain the solid particle flow and heat transfer in the charging particle heater 150. Another design uses the heating elements 180 themselves to provide the thermal energy (e.g., electrical current would run through the heating element 180 itself, not a wire wrapped around the heating element 180). Ceramic and SiC heating elements 180 can be prefabricated with specific shapes that are likely only suitable for mass production, because special shaped mold may need to be used for large production scale. Scaling up a particle heater 150 to the large quantities that may be needed for full-scale operations may support various shape requirements while maintain a reasonable cost. In some embodiments of the present disclosure, a design for a high-performance heating element 180 may include MoSi$_2$ heating strips attached to refractory backing rods (i.e., support 189 as shown in FIG. 1D). MoSi$_2$ has superior high-temperature capabilities and high-heat flux values. Thus, among other materials, MoSi$_2$ can meet the high heating rate requirements anticipated for solid particle heat transfer.

As described herein, heating wires can provide electric resistance heating to the heating elements 180 contained in a particle heater 150, thereby raising the temperature of the solid particles 102 passing through the particle heater 150. In some embodiments of the present disclosure, a heating wire may wrap around a refractory backing support and to terminate on a metal block at a desirable temperature condition. A metal terminal block may link to an electric bus bar that may also support a heater module of a particle heater 150. The support bus bar may be placed inside the heater chamber at temperature below 350° C., the cold solid particle inlet temperature.

To achieve low-cost and high reliability, heating elements 180 may be different from a prototype particle heater 150 for the following reason:
  1. A prototype particle heater 150 is easily fabricated in small quantities and is a good starting point for particle heater 150 characterization.
  2. Wire in contact with solid particles may have a life-span issues.
  3. A concept of a firebrick resistance heater that directly uses refractory material as a resistor heater may be used, which simplifies the heater design and minimizes failure due to fire.
  4. A product particle heater 150 may use other ceramics or refractory material with appropriate dielectric properties and manufacturability.

Figure 13:
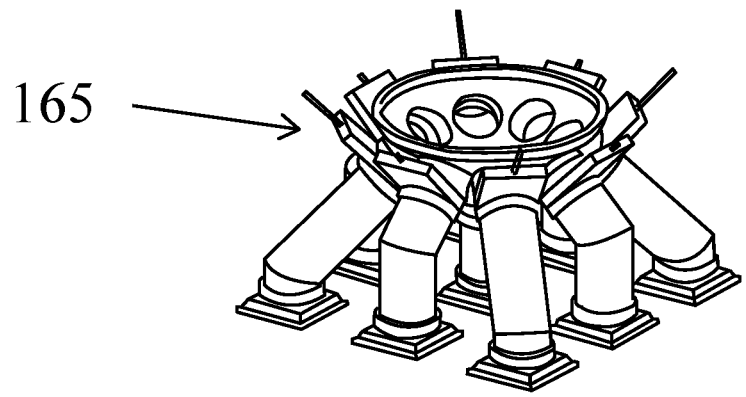
FIG. 13 illustrates solid particle inlet (i.e., distributor) and outtake (i.e., collector) for the modular heater integration and exemplary particle flow control and distribution components, according to some embodiments of the present disclosure.
Figure 13:
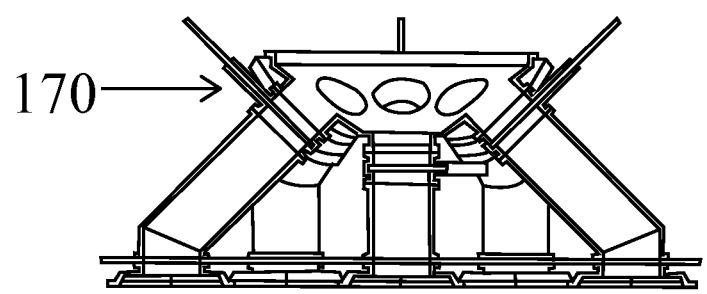

As describe above, a particle heater 150 may be designed in a modular configuration with fixed power and solid particle flow rates for each heater module 155 making up the particle heater 150. A solid particle flow rate may be predetermined by the heating element 180 shape, size, and arrangement. This results in a solid particle flow control strategy that avoids using variable valves or any moving parts operating under extremely high temperature conditions. Since the flow control strategy described herein only needs on/off states for each heater module 155, the solid particle flow control valve may simply use gate valves 175 located in the solid particle distributors and/or flow passages directing solid particles to each individual heater module. Among other things, this solid particle flow control design reduces particle heater 150 cost and improves the operating reliability. Such features are illustrated in FIG. 13, according to some embodiments of the present disclosure.

Figure 14:
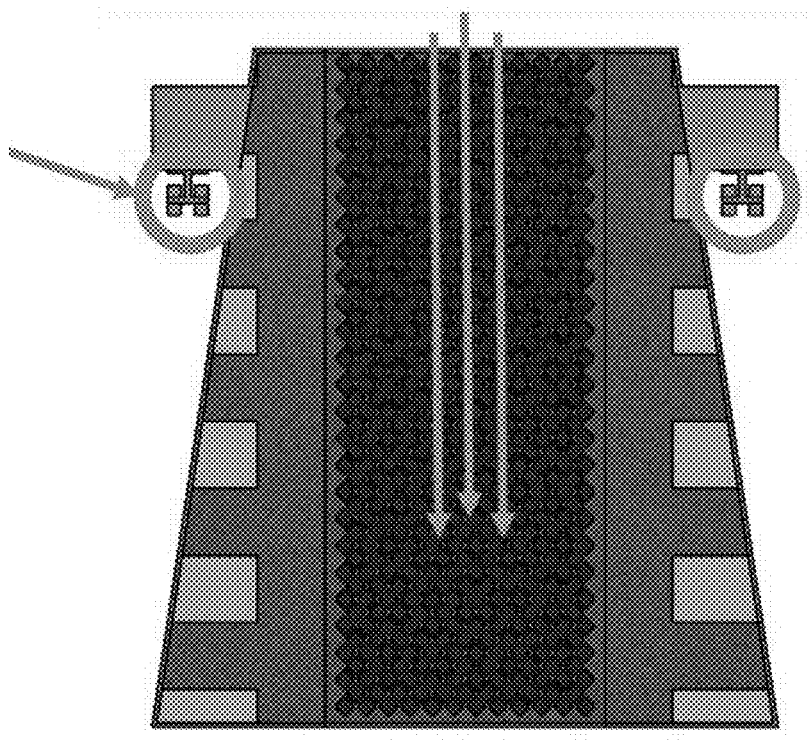
FIG. 14 illustrates a cross-section of a single heater module, according to some embodiments of the present disclosure.

FIG. 14 illustrates a single heater module 155 that is contained in a housing 160, according to some embodiments of the present disclosure. A heater module 155 houses numerous individual heating elements 180 that are in direct contact with solid particles 102 in order to heat the solid particles 102. As mentioned, a heater module 155 is designed with fixed solid particle flow and heating capacity. A single heater module 155 can be operated only in on or off states with the number of heater modules 155 on varying according to the charging load. The enclosure of each heater module 155 may be internally insulated to keep the temperature of the interior of the housing 160 outside of the heater modules 155 below 300° C. The housing 160 layers may be made of refractory, calcium silicate, and/or mineral wool to, among other things, protect the steel rail, electric connectors, and structure. The entirety of each heater module 155 may be mounted on rollers connected to a support 177 (such as an I-beam) for easy removal and maintenance.

A particle heater 150 may be powered using grid alternating current (AC) power after converting to the required heating wire input voltage. The maximum particle heater 150 operating temperature and the solid particle exit temperature will be monitored for safety and to ensure the particle heater 150 is achieving the set point operating temperature (e.g., about 1,200° C.). A full-scale particle heater 150, including power supply, will use the most up to date industry standards for production cost and service life. In some embodiments of the present disclosure, each heater module 155 may be integrated into an overall particle heater 150 by mounting the heater modules 155 below a particle distributor 165 that receives the relatively cold solid particles that have been discharged from the particle heater 150 used to convert the thermal energy stored in the solid particles 102 back to electricity (e.g., using a pressurized fluidized bed heat exchanger). The heater modules 155 may then connect to a particle collector 170 (i.e., bottom hopper) that distributes the heated solid particles 102 to a designated thermal energy storage silo 101 to be held until required for electricity generation.

In some embodiments of the present disclosure, a heater module 155 may not of itself provide solid particle flow control other than by the resistance to solid particle flow provided by the heating elements 180 themselves contained within the heater module 155. Flow to a particular heater module 155 will be either on or off depending on the position of the corresponding gate valve 175 controlling the flow to a particular heater module 155.

Heater modules 155 may be integrated into a complete particle heater 150 that provides solid particle flow control to each individual heater module 155 (e.g., using gate valves 175), as well electrical connections to the power lines connecting to the electrical grid. Heated solid particles 102 may collect in the particle distributor 165 and to be dispensed by corresponding gate valves 175 operating at the targeted high target temperature (e.g., 1,200° C.). Heater modules 155 may be supported by an I-beam and/or steel rail that may also conduct electricity from the electrical power supply to the heater modules 155. A heater module 155 may slide on the rail and to be moved out of the particle heater 150 for maintenance.

Figure 15:
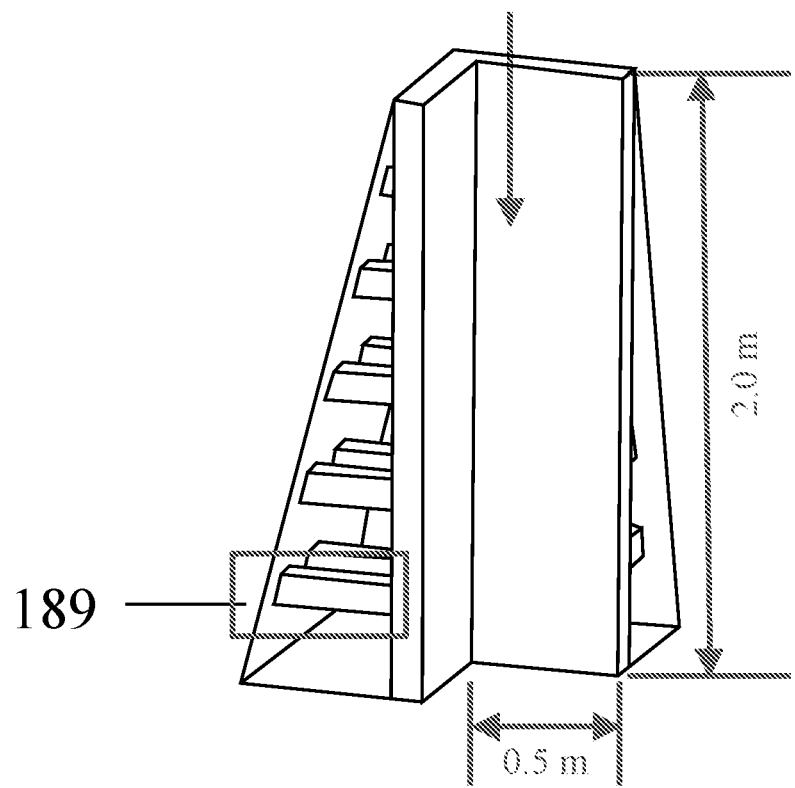
FIG. 15 illustrates the full geometry with material types for a finite element analysis (FEA) thermal model of a heater module's insulation, according to some embodiments of the present disclosure. The insulation material is displayed as transparent to show the presence of the supporting rods composed of the refractory material.

In addition, using ANSYS Mechanical, a finite element analysis (FEA) solver, a steady-state thermal model was built to study the potential insulation 185 requirements of an individual heater module 155. The geometry used represented a 1.0 m² square solid particle 102 inlet area and 2.0 m height of the heater module 155; as this is a general case, design changes were easily accommodated, and new results quickly produced and analyzed. For computational efficiency, the geometry was sliced into a quarter along the center lines of symmetry, as shown in FIG. 15. In this example, a cast refractory layer, composed of Petromax® 550 by Allied Mineral, was used as the most interior insulation 185 material due to its high thermal limit and mechanical strength. However, the resultant particle heater 150 may potentially be extremely heavy, costly, and significantly larger if refractory was the sole insulator utilized. Therefore, a design decision was made to cast the refractory material with supporting rods of the same material to connect to the outer steel shell to maintain the structural integrity of the particle heater 150. The remaining volume would be filled with a cheaper, less dense insulation material, such as, for example, calcium silicate (CaSi) and/or mineral wool, which were both chosen as candidates in this study. With the geometry established, several insulation designs were evaluated. Each insulation 185 design was evaluated over a range of convective heat transfer coefficients ranging from 1.0-10.0 W/m²-K to simulate natural and forced convection conditions. The ambient temperature was fixed for this convection was fixed at 300° C. because individual heater modules 155 may be contained in a larger container (i.e., housing 160), in addition to the complete particle heater 150 being insulated further to protect from the environmental weather conditions.

Figure 16:
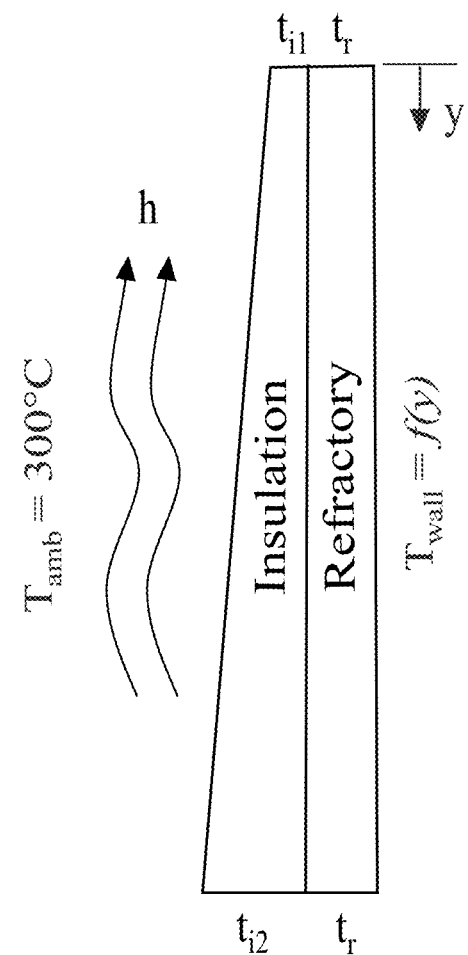
FIG. 16 provides a model description with applied boundary conditions: (1) variable convection (1.0-10.0 W/m²-K) on exterior wall of the steel shell with a fixed ambient temperature and (2) a wall temperature profile as a function of position, both linear and exponential profiles were used, according to some embodiments of the present disclosure.

To simulate the solid particles heating along the length of a heater module 155, a 1D temperature profile was applied to the exposed refractory surface. An applied temperature profile instead of a convective heat transfer boundary condition was applied due to the high solid particle-surface heat transfer coefficients expected; this means the temperature gradient between the surface and ambient solid particle domain will likely be relatively small. Two temperature profiles were implemented, linear and exponential, to simulate different potential heating scenarios. Regardless of the profile shape, both profiles raised the solid particle temperature from about 300° C. to about 1,200° C. from inlet (top) to outlet (bottom) of the particle heater 150. FIG. 16 contains a visual representation of the boundary conditions as well as the insulation thickness parameters ($t_r$, $t_{i1}$, and $t_{i2}$) that were varied to produce different insulation 185 designs. Three designs were chosen to be reported here and their associated insulation 185 dimensions are shown in Table 5. Table 5 presents three insulation designs selected. The volumes for the refractory and insulation of a full single heater, $V_r$ and $V_i$, respectively, and the associated total insulation material (refractory+CaSi) cost for a full-size single heater module. In some embodiments, the heater module 155 may have a diameter in the range of about 0.1 m to about 10 m and a height in the range of about 0.1 m to about 10 m. For example, in some embodiments, the heater module 155 may have a diameter of less than 1 m and a height of less than 4 m.

TABLE 5

Insulation designs and associated thickness and volume.

| Design No. | $t_r$ (m) | $T_{i1}$ (m) | $t_{i2}$ (m) | $V_r$ (ms) | $V_i$ (ms) |
|---|---|---|---|---|---|
| 1 | 0.1 | 0.0 | 0.5 | 1.08 | 2.88 |
| 2 | 0.2 | 0.1 | 0.5 | 2.16 | 3.96 |
| 3 | 0.2 | 0.1 | 0.3 | 2.08 | 2.44 |

The choice of insulation 185 material indicates that a configuration resembling Design #3 in Table 5 strikes a balance between performance and cost. Design #3 is cheaper than both designs while meeting temperature constraints of the CaSi utilized and reducing the average exterior temperature of the steel shell to reasonable temperatures near 300° C. Therefore, around 0.5 m of insulation 185 at the thickest point ($t_r+t_{r2}$) should be expected to achieve sufficient insulation between the interior and exterior of the heater; this is valuable knowledge going forward for the heater component design.

A summary of some of the key benefits offered by the electric particle heater 150 designs described herein include:
1) Particle heater 150 layout, including multiple heater modules 155 in particle heater 150 assembly allows for:
   a) Movable (both entire particle heater 150 and the heater modules 155)
   b) Fixed load and solid particle flow in each heater module 155
   c) Solid particle dispensing and collecting through dispenser 165 and collector 170
2) Modular design
   a) Flow control of solid particles through the particle heater 150
   b) Electric connection to heating elements 180
   c) Support structure to support and possibly connect the heater modules 155
3) Heating elements 180 assembly and support,
   a) Heating elements 180 have unique cross-sectional shape 183 for maximum solid particle flow through the particle heater 150
   b) Tube shape and arrangement for solid particle heating The foregoing discussion and examples have been presented for purposes of illustration and description. The foregoing is not intended to limit the aspects, embodiments, or configurations to the form or forms disclosed herein. In the foregoing Detailed Description for example, various features of the aspects, embodiments, or configurations are grouped together in one or more embodiments, configurations, or aspects for the purpose of streamlining the disclosure. The features of the aspects, embodiments, or configurations may be combined in alternate aspects, embodiments, or configurations other than those discussed above. This method of disclosure is not to be interpreted as reflecting an intention that the aspects, embodiments, or configurations require more features than are expressly recited in each claim. Rather, as the following claims reflect, inventive aspects lie in less than all features of a single foregoing disclosed embodiment, configuration, or aspect. While certain aspects of conventional technology have been discussed to facilitate disclosure of some embodiments of the present invention, the Applicants in no way disclaim these technical aspects, and it is contemplated that the claimed invention may encompass one or more of the conventional technical aspects discussed herein. Thus, the following claims are hereby incorporated into this Detailed Description, with each claim standing on its own as a separate aspect, embodiment, or configuration.

What is claimed is:

1. A heater for heating a plurality of solid particles, the heater comprising:
   at least two three-dimensional (3D) shapes, each 3D shape comprising at least two surfaces; and
   a block positioned between the at least two 3D shapes; wherein:
   each surface of each 3D shape comprises at least two lateral edges positioned substantially parallel to a first axis (z), each lateral edge has a length between a proximal end and a distal end,
   each surface comprises a proximal edge positioned at the proximal end of the length and within a first plane defined by a second axis (x) and a third axis (y),
   the proximal edges of each surface of each 3D shape form a cross-sectional shape in the plane,
   at least one surface of each 3D shape is positioned to face at least one surface of another 3D shape defining a channel,
   the channel is oriented to enable the gravitational flow of the plurality of solid particles through the channel,
   at least one surface defining the channel is configured to transfer heat to at least a portion of the plurality of solid particles,
   the block fills at least a portion of the channel and is configured to maintain the width of the channel,
   x and y are each perpendicular to z,
   x and y are perpendicular to each other, and
   the channel has a width substantially parallel with x.

2. The heater of claim 1, wherein:
   the at least one surface defining the channel is configured to operate at a temperature between about 500° C. to about 1500° C.

3. The heater of claim 1, wherein the cross-sectional shape is a polygon.

4. The heater of claim 3, wherein:
   the polygon has an interior angle defined as the angle between x and a proximal edge, and
   the interior angle is in the range of about 5° to about 60°.

5. The heater of claim 4, wherein the interior angle is approximately 10°.

6. The heater of claim 3, wherein the polygon is a triangle, a quadrilateral, a pentagon, a hexagon, a heptagon, an octagon, a nonagon, or a decagon.

7. The heater of claim 1, wherein:
   the at least one surface defining the channel configured to transfer heat comprises a resistive heating element.

8. The heater of claim 7, wherein the resistive heating element is positioned within an indentation in the at least one surface defining the channel.

9. The heater of claim 6, wherein the resistive heating element comprises an electric-resisting wire or bar.

10. The heater of claim 1, wherein:
    the channel has a height substantially parallel with y.

11. The heater of claim 10, wherein:
    the height is in the range of about 0.05 m to about 1.5 m.

12. The heater of claim 11, wherein:
    the height is approximately 0.15 m.

13. The heater of claim 1, wherein:
    the width is in the range of about 0.05 m to about 1.5 m.

14. The heater of claim 13, wherein:
    the width is approximately 0.15 m.

15. The heater of claim 1, wherein:
    the block comprises a substantially insulative material.

16. The heater of claim 1, wherein:
    the block is further configured to direct the plurality of solid particles towards the at least one surface defining the channel configured to transfer heat.

* * * * *